United States Patent
Koyama et al.

(10) Patent No.: US 11,070,814 B2
(45) Date of Patent: Jul. 20, 2021

(54) APPARATUS AND METHOD FOR VIDEO IMAGE ENCODING AND VIDEO IMAGE DECODING

(71) Applicant: FUJITSU LIMITED, Kawasaki (JP)

(72) Inventors: Jumpei Koyama, Setagaya (JP); Satoshi Shimada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 67 days.

(21) Appl. No.: 16/232,117

(22) Filed: Dec. 26, 2018

(65) Prior Publication Data
US 2019/0230360 A1   Jul. 25, 2019

(30) Foreign Application Priority Data
Jan. 23, 2018   (JP) .............................. JP2018-008727

(51) Int. Cl.
*H04N 19/139*   (2014.01)
*H04N 19/105*   (2014.01)
(Continued)

(52) U.S. Cl.
CPC ......... *H04N 19/139* (2014.11); *H04N 19/105* (2014.11); *H04N 19/159* (2014.11);
(Continued)

(58) Field of Classification Search
None
See application file for complete search history.

(56) References Cited

U.S. PATENT DOCUMENTS

2013/0136371 A1*   5/2013   Ikai .................... G06T 9/004
                                                          382/224
2015/0195526 A1*   7/2015   Zhu .................... H04N 19/105
                                                          375/240.14
(Continued)

FOREIGN PATENT DOCUMENTS

JP    2012-191298    10/2012
JP    2016-001858    1/2016

OTHER PUBLICATIONS

Zhu W, Ding W, Xu J, Shi Y, Yin B. Hash-based block matching for screen content coding. IEEE Transactions on Multimedia. Apr. 29, 2015;17(7):935-44. (Year: 2015).*

(Continued)

*Primary Examiner* — Clifford Hilaire
(74) *Attorney, Agent, or Firm* — Fujitsu Patent Center

(57) ABSTRACT

A video image encoding apparatus includes an in-picture motion vector calculation unit and a vector encoding unit. The in-picture motion vector calculation unit calculates an in-picture motion vector indicating a spatial movement amount between a block to be encoded and a reference block in an encoded region in the picture to be encoded. The vector encoding unit obtains a prediction vector for predicting the in-picture motion vector of the block to be encoded based on at least one of a first in-picture motion vector calculated in a first reference available region including a block encoded before the block to be encoded is encoded and a second in-picture motion vector calculated in a second reference available region including a block in a position corresponding to the block to be encoded in an already encoded reference picture, and performs prediction encoding on the in-picture motion vector based on the prediction vector.

16 Claims, 12 Drawing Sheets

(51) Int. Cl.
*H04N 19/159* (2014.01)
*H04N 19/577* (2014.01)
*H04N 19/176* (2014.01)
*H04N 19/52* (2014.01)
*H04N 19/513* (2014.01)

(52) U.S. Cl.
CPC ........... *H04N 19/176* (2014.11); *H04N 19/52* (2014.11); *H04N 19/521* (2014.11); *H04N 19/577* (2014.11)

(56) References Cited

U.S. PATENT DOCUMENTS

| | | | |
|---|---|---|---|
| 2015/0373366 A1* | 12/2015 | He | H04N 19/90 375/240.16 |
| 2017/0118484 A1 | 4/2017 | Maeda et al. | |
| 2017/0289566 A1* | 10/2017 | He | H04N 19/52 |

OTHER PUBLICATIONS

R. Joshi et al., "High Efficiency Video Coding(HEVC) Screen Content Coding: Draft 5", JCTVC-V1005, 22nd JCT-VC Meeting, Geneva, CH, Oct. 15-21, 2015 (677 pages.).

* cited by examiner

```
PICTURE DIVISION SYNTAX{
Imax (HORIZONTAL DIVISION NUMBER SYNTAX)
Jmax (VERTICAL DIVISION NUMBER SYNTAX)
divave (EQUAL DIVISION FLAG SYNTAX)
if( !divave) {
        for( i = 0; i < Imax; i++ )
                xDivri (HORIZONTAL DIVISION POSITION SYNTAX)
        for( j = 0; j < Jmax; j++ )
                yDivrj (VERTICAL DIVISION POSITION SYNTAX)
}
}
```

APPARATUS AND METHOD FOR VIDEO IMAGE ENCODING AND VIDEO IMAGE DECODING

CROSS-REFERENCE TO RELATED APPLICATION

This application is based upon and claims the benefit of priority of the prior Japanese Patent Application No. 2018-8727, filed on Jan. 23, 2018, the entire contents of which are incorporated herein by reference.

FIELD

The embodiment discussed herein is related to a video image (video image) encoding apparatus, a video image encoding method, and a computer program for video image encoding which are provided to encode video image data and a video image decoding apparatus, a video image decoding method, and a computer program for video image decoding which are provided to decode encoded video image data.

BACKGROUND

Video image data has a large amount of data. For example, video image data based on a standard for a large number of pixels, such as 4K or 8K, may have a considerably large amount of data. Therefore, an apparatus which processes video image data performs compression encoding on the video image data before transmitting the video image data to another device or before storing the video image data in a storage device. Examples of a representative encoding standard for video images include Moving Picture Experts Group phase 2 (MPEG-2), MPEG-4, and H.264 MPEG-4 Advanced Video Coding (MPEG-4 AVC/H.264) which are defined by International Standardization Organization/International Electrotechnical Commission (ISO/IEC). Furthermore, as a new standard, High Efficiency Video Coding (HEVC, MPEG-H/H.265) is defined by JCTVC which is run by ITU-T and ISO/IEC in cooperation.

Furthermore, JCTVC has discussed definition of Screen Contents Coding (SCC) which is a coding standard for screen contents as an expansion of HEVC. SCC is the encoding standard which is expected to be applied when an artificial image, such as an image displayed in a desktop screen of a computer, is to be encoded and is discussed to be used for encoding performed on an image transmitted from a server to a thin client terminal, for example.

For example, screen images have features different from natural images. For example, the same object is included in a plurality of images which are consecutive in time series in a natural image, and therefore, the plurality of consecutive images have high correlation in many cases. Therefore, an inter prediction encoding method for encoding a picture to be encoded with reference to an encoded picture is applied for a natural image so that high encoding efficiency is attained.

On the other hand, unlike natural images, an object which has not been displayed may be displayed at a certain moment in screen images. For example, in a case where a new window is displayed in a desktop screen by operating a computer, the window instantaneously appears, and therefore, pictures before and after the window appears have low correlation. Therefore, an intra prediction encoding method for encoding a block to be encoded with reference to an encoded region which is positioned adjacent to the block to be encoded is employed in a region which displays the appearing window. Encoding efficiency of the intra prediction encoding method is lower than encoding efficiency of the inter prediction encoding method, and therefore, an encoding efficiency of the region which displays the appearing window is low.

However, in a screen image, different regions having similar textures, such as a background displaying a uniform pattern and a blank portion in a window, may be included in the same picture. These regions have considerably high correlation.

Therefore, in SCC, introduction of a technique of encoding a block to be encoded using an encoded region in a picture to be encoded including the block to be encoded as a reference block which is referred to as an intra block copy (IBC) prediction encoding method has been discussed (refer to "High Efficiency Video Coding (HEVC) Screen Content Coding: Draft 5", R. Joshi et al., JCTVC-V1005, 22nd JCT-VC Meeting, Geneva, CH, 15-21 Oct. 2015, for example). When the IBC prediction encoding method is employed, improvement of encoding efficiency of a picture including regions having low temporal correlation as described above is expected.

As with the IBC prediction encoding method, a motion vector indicating the relative positional relationship between a block to be encoded and a reference block is calculated in the IBC prediction encoding method. Furthermore, in the SCC, the IBC prediction encoding method utilizes a framework of the inter prediction encoding method. Therefore, a motion vector in a picture calculated in the IBC prediction encoding method may be also subjected to the prediction encoding similarly to a motion vector between pictures in the inter prediction encoding method.

According to "High Efficiency Video Coding (HEVC) Screen Content Coding: Draft 5", R. Joshi et al., JCTVC-V1005, 22nd JCT-VC Meeting, Geneva, CH, 15-21 Oct. 2015, in a case where the IBC prediction encoding method in which a picture to be encoded is used as a reference picture is employed, the reference picture is classified as a long-term reference picture. The long-term reference picture is generally a special reference picture temporally separated from the picture to be encoded. Therefore, when the IBC prediction encoding method is employed, that is, when the picture to be encoded is used as the reference picture, the picture to be encoded is used as the long-term reference picture.

In a case where a block to be encoded uses a region in the long-term reference picture as a reference block, a block having a motion vector referenced due to motion vector prediction is required to refer to the long-term reference picture. Note that the block having the motion vector to be referenced is a surrounding block near the block to be encoded or a block CoIPU which is disposed in a position corresponding to the block to be encoded in a temporally previous encoded picture ColPic. Therefore, a motion vector of the surrounding block or CoIPU may not be used for the motion vector prediction unless the surrounding block or CoIPU refers to the long-term reference picture. Furthermore, according to "High Efficiency Video Coding (HEVC) Screen Content Coding: Draft 5", R. Joshi et al., JCTVC-V1005, 22nd JCT-VC Meeting, Geneva, CH, 15-21 Oct. 2015, the motion vector of the surrounding block or the motion vector of CoIPU is simply used as the motion vector prediction. Accordingly, the surrounding block or CoIPU which is referenced when the prediction encoding is performed is required to be encoded by the IBC prediction encoding method before an in-picture motion vector in the block to be encoded to which the IBC prediction encoding method is applied is subjected to the prediction encoding. However, the in-picture motion vector (hereinafter referred to as an "IBC vector") employing the IBC prediction encoding method refers to an encoded region in the picture to be encoded as a characteristic thereof. Therefore, the number of blocks to be encoded by the IBC prediction encoding method is generally smaller than the number of blocks to be encoded by the inter prediction encoding method. As a result, an IBC vector to be referenced for prediction encoding of the IBC vector may not exist, and therefore, improvement of encoding efficiency in the motion vector prediction may not be attained. Furthermore, if a motion vector of a block which has been subjected to the inter prediction encoding is used in prediction of an IBC vector, a reference region in the block which has been subjected to the inter prediction encoding is not restricted unlike the block to be subjected to the IBC prediction encoding. Therefore, a difference between the IBC vector of the block to be encoded and a motion vector of an adjacent block is large, and an encoding amount is not reduced even if the IBC vector is predicted using such a motion vector.

According to an aspect of the present disclosure, a video image encoding apparatus which improves possibility of prediction encoding on a motion vector in the IBC prediction encoding method is provided.

SUMMARY

According to an aspect of the embodiments, a video image encoding apparatus includes an in-picture motion vector calculation unit and a vector encoding unit. The in-picture motion vector calculation unit calculates an in-picture motion vector indicating a spatial movement amount between a block to be encoded and a reference block in an encoded region in the picture to be encoded. The vector encoding unit obtains a prediction vector for predicting the in-picture motion vector of the block to be encoded based on at least one of a first in-picture motion vector calculated in a first reference available region including a block encoded before the block to be encoded is encoded and a second in-picture motion vector calculated in a second reference available region including a block in a position corresponding to the block to be encoded in an already encoded reference picture, and performs prediction encoding on the in-picture motion vector based on the prediction vector.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, a video image encoding apparatus and a video image decoding apparatus will be described with reference to the accompanying drawings. The video image encoding apparatus divides a picture according to a block which is a generation unit of a prediction block and performs prediction encoding for each block. In this case, the video image encoding apparatus refers to CoIPU and an IBC vector included in a reference available region to which a block surrounding CoIPU belongs as a prediction vector candidate used when prediction encoding is performed on an IBC vector of a block to be encoded to which the IBC prediction encoding method is employed. Furthermore, the video image encoding apparatus sets a reference available region in ColPic as a region assumed to have an IBC vector similar to the IBC vector of the block to be encoded in accordance with a position of the block to be encoded in a picture to be encoded.

In this embodiment, the video image encoding apparatus encodes video image data in accordance with H.265. However, the video image encoding apparatus may encode video image data in accordance with another encoding standard to which IBC is applicable, or an encoding standard in which a block serving as a generation unit of a prediction block coincides with a block serving as a unit of orthogonal transform, for example.

Furthermore, a picture may be a frame or a field. A frame is a type of still image in video image data, and on the other hand, a field is a still image obtained by extracting data in odd-numbered rows or data in even-numbered rows from a frame.

Figure 1:
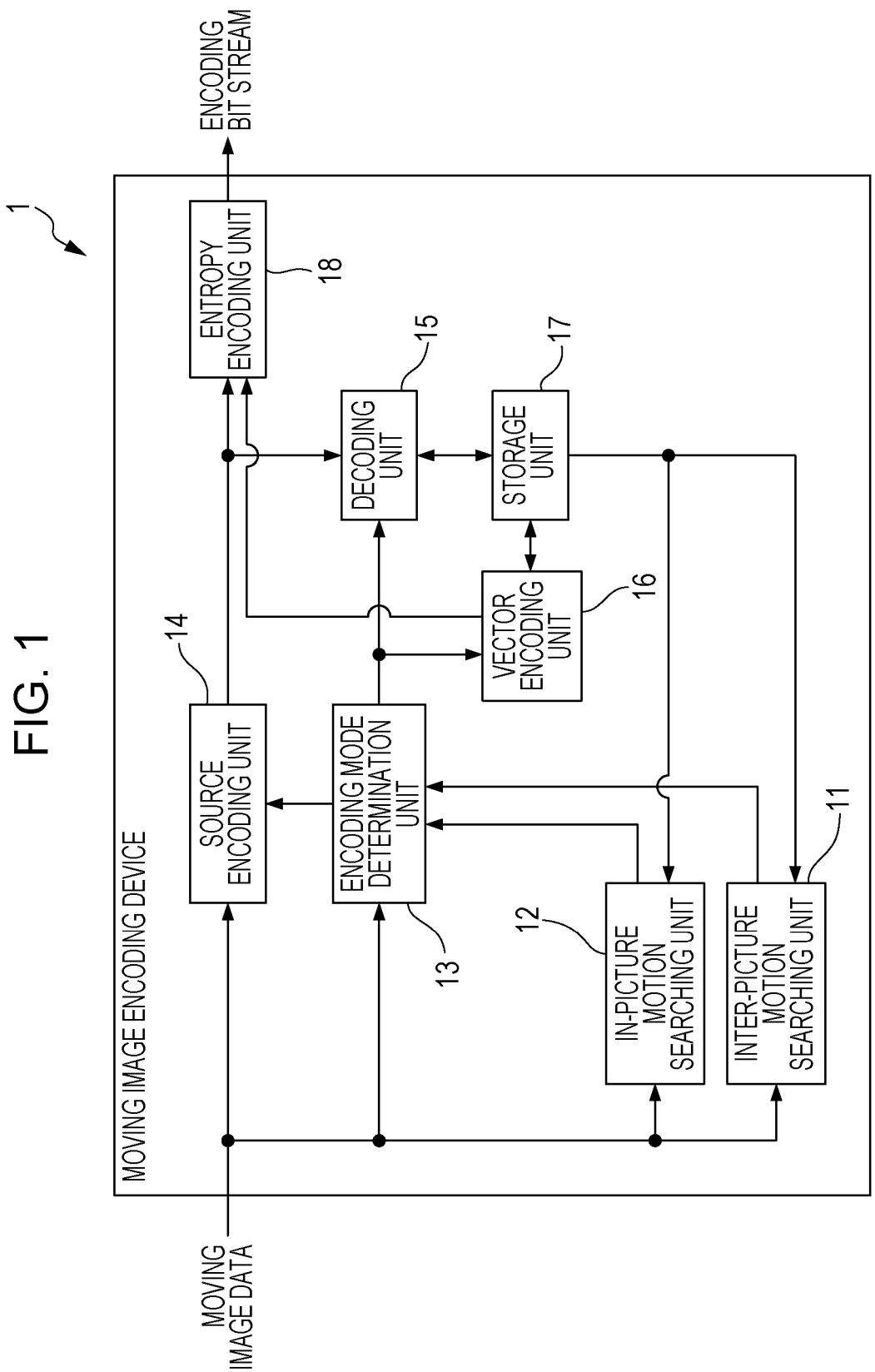
FIG. 1 is a diagram schematically illustrating a configuration of a video image encoding apparatus according to an embodiment.

FIG. 1 is a diagram schematically illustrating a configuration of a video image encoding apparatus according to an embodiment. A video image encoding apparatus 1 includes an inter-picture motion searching unit 11, an in-picture motion searching unit 12, an encoding mode determination unit 13, a source encoding unit 14, a decoding unit 15, a vector encoding unit 16, a storage unit 17, and an entropy encoding unit 18.

The units included in the video image encoding apparatus 1 are formed as individual circuits. Alternatively, the units included in the video image encoding apparatus 1 may be implemented in the video image encoding apparatus 1 as a single integrated circuit or a plurality of integrated circuits in which the circuits corresponding to the units are integrated. Furthermore, the units included in the video image encoding apparatus 1 may be functional modules which are realized by computer programs executed in a single processor or a plurality of processors included in the video image encoding apparatus 1.

HEVC which is a standard employed in the video image encoding apparatus 1 divides each picture included in video image data in a plurality of steps. Therefore, first, picture division in HEVC will be described.

Figure 2:
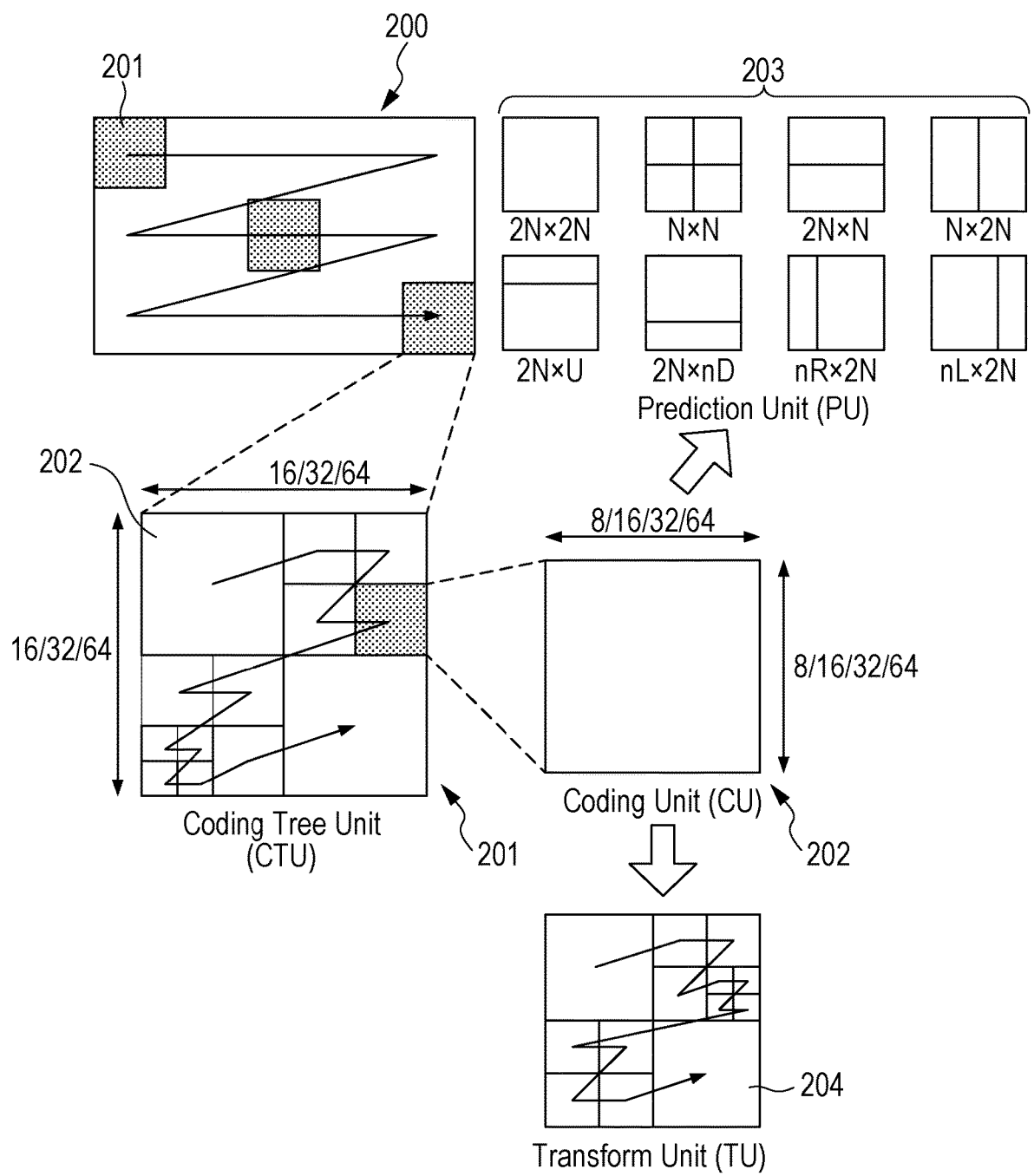
FIG. 2 is a diagram illustrating an example of picture division by HEVC.

FIG. 2 is a diagram illustrating an example of picture division by HEVC. As illustrated in FIG. 2, a picture 200 is divided into coding tree units (CTUs) each of which is a unit of an encoding process and the CTUs 201 are encoded in order of raster scan. A size of each of the CTUs 201 is selected in a range from 64×64 pixels to 16×16 pixels.

Furthermore, each of the CTUs 201 is divided into a plurality of coding units (CUs) 202 in a quad-tree structure. The CUs 202 included in each of the CTUs 201 are encoded in order of Z scan. A size of the CUs 202 is variable and is selected in a range from 8×8 pixels to 64×64 pixels in a CU division mode. The CU 202 is a unit for selecting an intra prediction encoding method, an inter prediction encoding method, or an IBC prediction encoding method, which is an encoding mode.

The CUs 202 are individually processed in in a unit of a prediction unit (PU) 203 or a unit of a transform unit (TU) 204. The PU 203 is a unit of generation of a prediction block for prediction in accordance with an encoding mode. For example, the PU 203 is a unit to which a prediction mode for defining a pixel to be referenced when a prediction block is generated and a method for generating a prediction block is applied in the intra prediction encoding method. On the other hand, the PU 203 is a unit of motion compensation in the inter prediction encoding method or the IBC prediction encoding method. A size of the PU 203 may be selected from among 2N×2N, N×N, 2N×N, N×2N, 2N×U, 2N×nD, nR×2N, and nL×2N (N is a half of a CU size) when the inter prediction encoding method or the IBC prediction encoding method is employed, for example. On the other hand, each of the TUs 204 is a unit of orthogonal transform and the orthogonal transform is performed for each TU. A size of each of the TUs 204 is selected in a range from 4×4 pixels to 32×32 pixels. Each of the TUs 204 is divided by the quad-tree structure and processed in order of the Z scan. Note that the CU and the PU are example of a block to be encoded.

The video image encoding apparatus 1 encodes the CTUs in the order of raster scan in a picture to be encoded. Hereinafter, a process performed on a single CTU by the units included in the video image encoding apparatus 1 will be described.

When a picture to be encoded including a CTU to be encoded is a P picture or a B picture to which the inter prediction encoding method is applicable, the inter-picture motion searching unit 11 calculates a motion vector of the CTU to be encoded for each applicable PU. Note that a type of picture to be encoded is determined based on a structure of a group of pictures (GOP) to be applied by a control unit (not illustrated) to video image data to be encoded and a position of the picture to be encoded in the GOP.

The inter-picture motion searching unit 11 performs block matching on a region in which a local decoding picture is available for reference in a target PU of the CTU to be encoded so as to specify a reference block which is most similar to the target PU. Then the inter-picture motion searching unit 11 calculates a vector indicating an amount of a movement between the target PU and the reference block as a motion vector. Note that, when the picture to be encoded is a B picture, the inter-picture motion searching unit 11 individually calculates motion vectors of L0 prediction and L1 prediction. The inter-picture motion searching unit 11 stores motion vectors of the PUs in the storage unit 17, and in addition, transmits the motion vectors to the encoding mode determination unit 13.

The in-picture motion searching unit 12 is an example of an in-picture motion vector calculation unit which calculates an IBC vector for each applicable PU of the CTU to be encoded with reference to an encoded region of the picture to be encoded including the CTU to be encoded. The in-picture motion searching unit 12 may calculate an IBC vector even in a case where the picture to be encoded is an I picture to which the inter prediction encoding method is not applicable in addition to the case where the picture to be encoded is a P picture or a B picture.

As with the inter-picture motion searching unit 11, the in-picture motion searching unit 12 performs block matching on an encoded region in the picture to be encoded for a target PU of the CTU to be encoded so as to specify a reference block which is most similar to the target PU. Note that, since the individual CTUs are encoded in the order of raster scan as described above, the encoded region is on a left side or an upper side relative to the target PU. Then the in-picture motion searching unit 12 calculates a vector indicating an amount of a movement between the target PU and the reference block as an IBC vector. The in-picture motion searching unit 12 stores the IBC vectors of the PUs in the storage unit 17, and in addition, transmits the IBC vectors to the encoding mode determination unit 13.

The encoding mode determination unit 13 determines division modes of the CU, the PU, and the TU for the division of the CTU to be encoded and an encoding mode to be applied for each CU. The encoding mode determination unit 13 determines an encoding mode of the CTU to be encoded based on information indicating a type of picture to be encoded including the CTU to be encoded which is obtained from the control unit not illustrated, for example. In a case where a type of picture to be encoded is an I picture to which the inter prediction encoding method is not to be applied, the encoding mode determination unit 13 selects the intra prediction encoding method or the IBC prediction encoding method as an encoding mode to be applied. Furthermore, in a case where a type of picture to be encoded is a P picture or a B picture, the encoding mode determination unit 13 selects one of the inter prediction encoding method, the intra prediction encoding method, and the IBC prediction encoding method as an encoding mode to be applied, for example.

The encoding mode determination unit 13, for each CU calculates encoding costs which are evaluation values of encoded data amounts of the CTU to be encoded in an applicable encoding mode. For example, the encoding mode determination unit 13 calculates an encoding cost for each combination of a CU division mode for division of the CTU, a PU division mode, and a vector mode for defining a method for generating a prediction vector of a motion vector in the inter prediction encoding method. Note that the encoding mode determination unit 13 may utilize an adaptive motion vector prediction (AMVP) mode or a Merge mode, for example, as a vector mode. In the AMVP mode, a difference vector is encoded using a prediction vector. In the merge mode, a prediction vector obtained from a motion vector of the encoded PU is copied as a motion vector of a PU to be encoded.

Similarly, the encoding mode determination unit 13 calculates an encoding cost for each combination of a CU division mode for division of the CTU, a PU division mode, and a vector mode also in the IBC prediction encoding method. Also in this case, the encoding mode determination unit 13 may utilize the AMVP mode or the Merge mode, for example, as a vector mode. Note that the encoding mode determination unit 13 at least executes the same process as the vector encoding unit 16 so as to calculate an encoding cost associated with the vector mode. The process performed by the vector encoding unit 16 will be described hereinafter in detail.

Furthermore, in the intra prediction encoding method, the encoding mode determination unit 13 calculates an encoding cost for each combination of the CU division mode for division of the CTU, the PU division mode, and the prediction mode.

The encoding mode determination unit 13 calculates a prediction error, that is, a sum of absolute difference SAD of pixels of the target PU, for example, in accordance with the following equation so as to calculate an encoding cost.

SAD=Σ|OrgPixel−PredPixel|

Here, "OrgPixel" is a value of a pixel included in the target PU and "PredPixel" is a value of a pixel included in a prediction block generated in accordance with an encoding mode for calculation of the encoding cost which corresponds to a target block.

Then the encoding mode determination unit 13 calculates an encoding cost of the target CU in accordance with the following equation, for example.

Cost=ΣSAD+λ*B

Here, "ΣSAD" indicates a sum of SADs calculated for individual PUs included in the target CU. Furthermore, "B" indicates an estimation value of an encoding amount of an item other than the prediction error, such as motion vector or a flag indicating a prediction mode. Moreover, "λ" indicates an undetermined multiplier Lagrange's method.

Note that the encoding mode determination unit 13 may calculate a sum of absolute transformed difference (SATD) of Hadamard transform coefficients of individual pixels obtained after a difference image between the target PU and the prediction block is subjected to Hadamard transform, instead of SAD.

The encoding mode determination unit 13 successively sets a target CU in descending order of possible CU sizes, for example, in the CTU to be encoded. Thereafter, the encoding mode determination unit 13 selects a prediction mode which attains a smallest cost for each PU division mode in the target CU in the intra prediction encoding method. Furthermore, the encoding mode determination unit 13 selects a vector mode which attains a smallest cost for each PU division mode in the target CU in the inter prediction encoding method or the IBC prediction encoding method. Furthermore, the encoding mode determination unit 13 selects one of the intra prediction encoding method, the inter prediction encoding method, and the IBC prediction encoding method which attains a smallest encoding cost for each CU of the same size as an encoding mode to be applied to the CU.

Furthermore, the encoding mode determination unit 13 executes the same process while each of four CUs obtained by dividing the target CU into four is set as a next target CU so as to calculate a smallest encoding cost. Then the encoding mode determination unit 13 obtains a sum of smallest encoding costs calculated for the four CUs obtained by the division and divides the target CU if the sum of the smallest encoding costs is smaller than a smallest encoding cost of the target CU. The encoding mode determination unit 13 repeatedly performs the process described above until division of the CUs is not performed, and determines a CU division mode and a PU division mode to be employed in the CTU to be encoded.

Furthermore, the encoding mode determination unit 13 determines a TU division mode for each CU which employs the CU division mode determined as described above. In this case, the encoding mode determination unit 13 calculates an RD cost in accordance with the following equation for each applicable TU division mode.

$$\text{Cost} = \sum_i (org(i) - ldec(i))^2 + \lambda \cdot \text{bit} \quad (1)$$

Here, "org(i)" indicates a value of a pixel included in the target CU, and "Idec(i)" indicates a value of a decoded pixel obtained by encoding the CU in the target TU division mode and further decoding the CU. Furthermore, "bit" indicates an encoding amount obtained when the CU is encoded in the target TU division mode. A first term on a right side of Expression (1) indicates encoding distortion and a second term on the right side indicates an encoding amount. Therefore, in the TU division mode corresponding to a smallest RD cost, optimum balance between the encoding distortion and the encoding amount is attained. Therefore, the encoding mode determination unit 13 selects a TU division mode which attains a smallest RD cost Cost.

The encoding mode determination unit 13 notifies the source encoding unit 14 of a combination of the division modes of the CU, the PU, and the TU selected for the CTU to be encoded and the encoding mode. Furthermore, the encoding mode determination unit 13 stores the combination of the division modes of the CU, the PU, and the TU selected for the CTU to be encoded and the encoding mode in the storage unit 17. Furthermore, the encoding mode determination unit 13 notifies the source encoding unit 14 and the vector encoding unit 16 of the IBC vector and the motion vector and stores the IBC vector and the motion vector in the storage unit 17.

The source encoding unit 14 is an example of an encoding unit which generates a prediction block for each PU in accordance with the combination of the division modes of the CU and the PU selected for the CTU to be encoded and the encoding mode. In a case where the target CU is subjected to the intra prediction encoding, the source encoding unit 14 generates a prediction block based on values of pixels which are referenced in accordance with a prediction mode selected for each PU in the CU and which are included in a local decoding block positioned near the PU.

On the other hand, in a case where the target CU is subjected to the inter prediction encoding, the source encoding unit 14 performs motion compensation on a local decoding picture read from the storage unit 17 for each PU in the CU based on a motion vector calculated for the PU so as to generate a prediction block. Similarly, in a case where the target CU is subjected to the IBC prediction encoding, the source encoding unit 14 performs motion compensation on a local decoding picture read from the storage unit 17 for each PU in the CU based on an IBC vector calculated for the PU so as to generate a prediction block.

When the prediction block is generated, the source encoding unit 14 executes difference calculation between individual pixels in the CTU to be encoded and corresponding pixels in the prediction block. Then the source encoding unit 14 determines difference values corresponding to the pixels in each of the TUs in the CTU to be encoded obtained by the difference calculation as prediction error signals of the TU.

The source encoding unit 14 obtains, from each of the TUs in the CTU to be encoded, an orthogonal transform coefficient indicating a frequency component in a horizontal direction and a frequency component in a vertical direction of the prediction error signal by performing orthogonal transform on the prediction error signal of the TU. For example, the source encoding unit 14 executes discrete cosine transform (DCT) as an orthogonal transform process on the prediction error signals to obtain a group of DCT coefficients as the orthogonal transform coefficient.

The source encoding unit 14 quantizes the orthogonal transform coefficients of the individual TUs in the CTU to be encoded in accordance with a quantization parameter including a qp value for specifying a quantization width so as to calculate quantized orthogonal transform coefficients. Note that the quantized orthogonal transform coefficients is simply referred to as "quantized coefficients" where appropriate hereinafter. The source encoding unit 14 outputs the quantized orthogonal transform coefficients to the decoding unit 15 and the entropy encoding unit 18.

The decoding unit 15 generates, using the quantized coefficients of the TUs in the CTU to be encoded, a local decoding block which is referenced when CUs after the TUs are to be encoded and stores the local decoding block in the storage unit 17. Therefore, the decoding unit 15 performs inverse quantization on the quantized coefficients of the individual TUs to restore the orthogonal transform coefficients obtained before the quantization.

The decoding unit 15 performs inverse orthogonal transform on the restored orthogonal transform coefficients for the individual TUs. When the source encoding unit 14 uses DCT as the orthogonal transform, for example, the decoding unit 15 executes an inverse DCT process as the inverse orthogonal transform. By this, the decoding unit 15 restores prediction error signals having the same information as the prediction error signals before the encoding for individual TUs.

The decoding unit 15 generates a local decoding block by adding the restored prediction error signals to pixel values of the prediction block of the TU for each TU. The decoding unit 15 stores the local decoding block in the storage unit 17 every time the local decoding block is generated.

Furthermore, the decoding unit 15 writes a local decoding picture obtained by connecting local decoding blocks for one picture in order of encoding of the CTUs in the storage unit 17.

The vector encoding unit 16 generates a list of prediction vector candidates of the PUs to which the inter prediction encoding method is applied in accordance with a vector mode determined to be employed by the encoding mode determination unit 13. The vector encoding unit 16 supplies information indicating a position of a candidate to be used as a prediction vector included in the prediction vector candidate list to the entropy encoding unit 18 for each PU to which the inter prediction encoding is applied. Furthermore, when the vector mode to be employed is the AMVP mode, the vector encoding unit 16 calculates a difference vector between a motion vector of the PU and the prediction vector.

Then the vector encoding unit 16 also supplies the calculated difference vector to the entropy encoding unit 18.

Similarly, the vector encoding unit 16 generates a prediction vector candidate list of the PUs to which the IBC prediction encoding method is applied in accordance with a vector mode determined to be employed by the encoding mode determination unit 13. The vector encoding unit 16 supplies information indicating a position of a candidate to be used as a prediction vector included in the prediction vector candidate list to the entropy encoding unit 18 for each PU to which the IBC prediction encoding is applied. Furthermore, when the vector mode to be employed is the AMVP mode, the vector encoding unit 16 calculates a difference vector between an IBC vector of the PU and the prediction vector. Then the vector encoding unit 16 also supplies the calculated difference vector to the entropy encoding unit 18.

The generation of the prediction vector candidate list of the PUs to which the IBC prediction encoding method is applied will now be described in detail.

In the AMVP mode and the Merge mode, following modes are defined as modes which define a method for generating a prediction vector candidate list.

Spatial mode: An IBC vector in a block spatially surrounding a block to be encoded is used as a candidate of a prediction vector. Note that a candidate of a prediction vector selected from among IBC vectors in the block spatially surrounding the block to be encoded in the Spatial mode is referred to as a "spatial prediction vector" hereinafter.

Temporal mode: An IBC vector in a block (CoIPU) positioned corresponding to a block to be encoded in a picture (ColPic) which has been encoded temporally before a picture to be encoded including the block to be encoded is used. Note that a candidate of a prediction vector selected from among IBC vectors in a block in another encoded picture in the Temporal mode is referred to as a "temporal prediction vector" hereinafter.

Zero mode: A zero vector having a size of zero, that is, a value of an element indicating a movement amount in a horizontal direction of 0 and a value of an element indicating a movement amount in a vertical direction of 0 is used.

In the AMVP mode, a prediction vector candidate list mvpListLX including two vector candidates at most which are available for prediction vectors is generated for each prediction direction.

Figure 3:
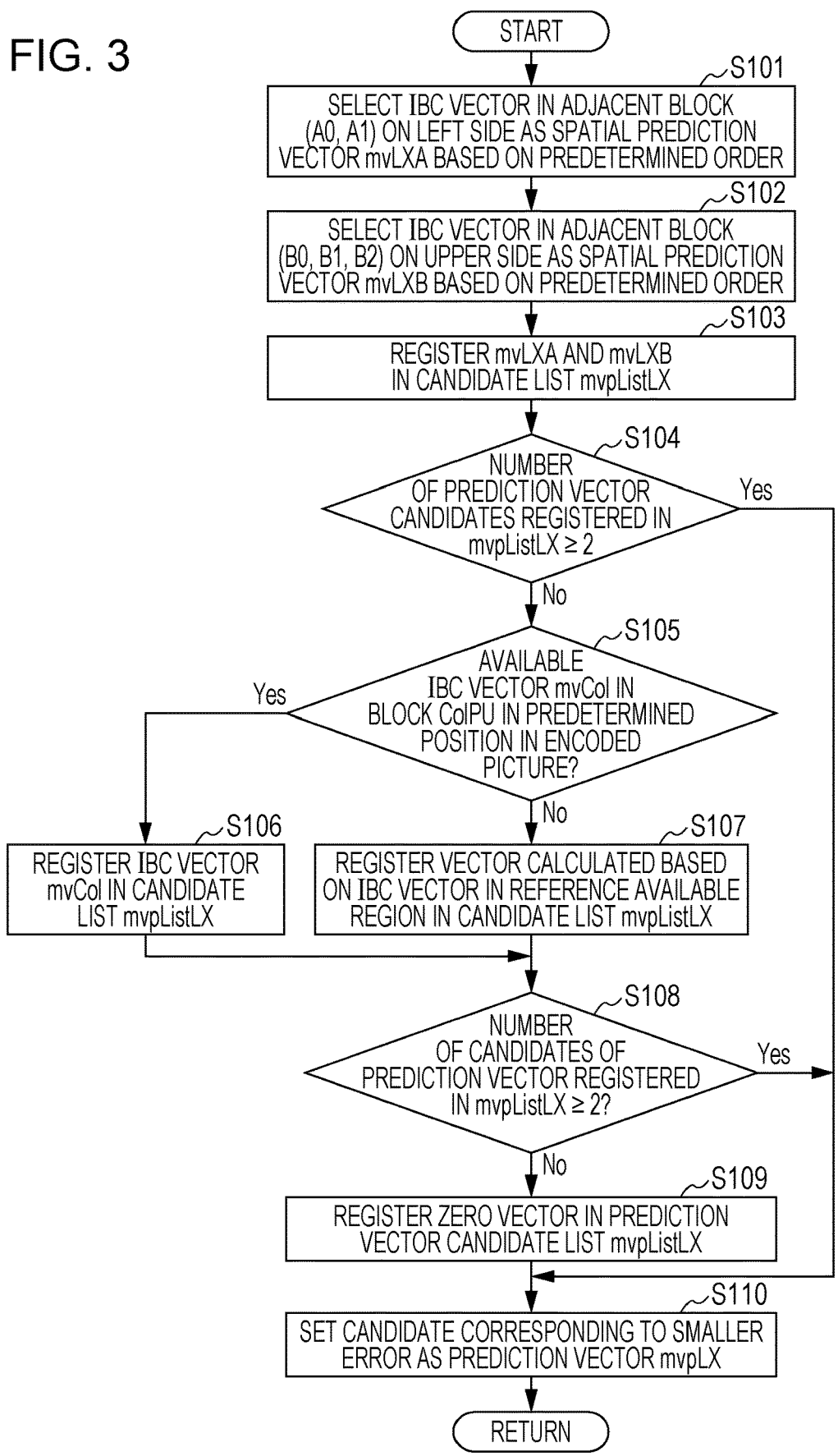
FIG. 3 is an operation flowchart of a procedure of detection of a prediction vector in an AMVP mode.

FIG. 3 is an operation flowchart of a procedure of determination of a prediction vector in the AMVP mode.

First, the vector encoding unit 16 selects a prediction vector candidate from among IBC vectors in a block which has been encoded and which is adjacent to the block to be encoded. Specifically, the vector encoding unit 16 selects an IBC vector of a block positioned on a left side of the block to be encoded as a spatial prediction vector mvLXA in predetermined order (step S101).

Figure 4:
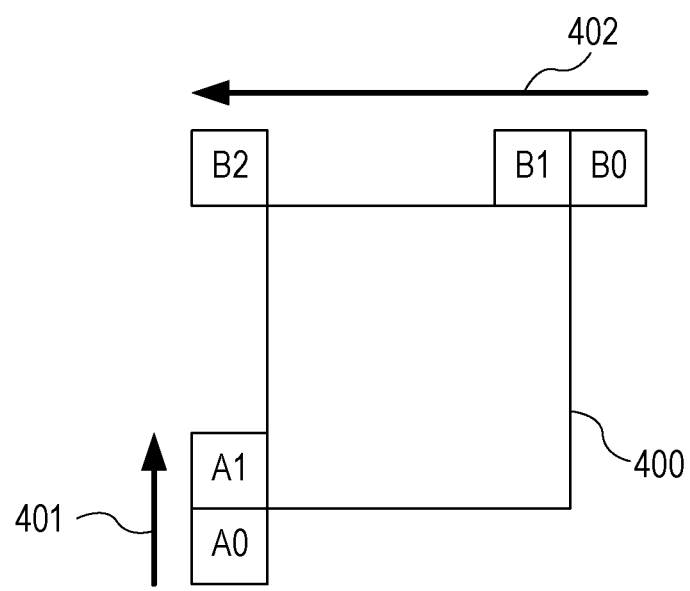
FIG. 4 is a diagram illustrating registration order of spatial prediction vectors in the AMVP mode.

The selection of a spatial prediction vector will be described in detail with reference to FIG. 4. FIG. 4 is a diagram illustrating registration order of spatial prediction vectors in the AMVP mode. The vector encoding unit 16 determines whether IBC vectors of individual blocks as spatial prediction vectors in order from a block A0 which is positioned on a lower left of a block to be encoded 400 and a block A1 which is positioned on an upper side of the block A0 as indicated by an arrow mark 401.

The vector encoding unit 16 determines whether the block A0 has been encoded. When the determination is affirmative, the vector encoding unit 16 determines whether the block A0 has been subjected to the IBC prediction encoding. When the determination is affirmative, the vector encoding unit 16 selects an IBC vector in the block A0 as a first spatial prediction vector mvLXA.

On the other hand, when the block A0 has not been subjected to the IBC prediction encoding, the vector encoding unit 16 performs the same determination process on the block A1. When the block A1 has been subjected to the IBC prediction encoding, the vector encoding unit 16 selects an IBC vector of the block A1 as the spatial prediction vector mvLXA.

Note that, if any of the blocks A0 and A1 is not subjected to the IBC prediction encoding, the spatial prediction vector mvLXA is not selected.

Next, the vector encoding unit 16 selects an IBC vector of a block which is adjacent to an upper portion of the block to be encoded as a spatial prediction vector mvLXB in predetermined order (step S102).

Referring back to FIG. 4, the vector encoding unit 16 performs the selection process which has been performed on the blocks A0 and A1 on blocks B0 to B2 which are adjacent to an upper portion of the block to be encoded 400 in order indicated by an arrow mark 402. Then the vector encoding unit 16 determines whether to select IBC vectors of the blocks B0 to B2 as the spatial prediction vector mvLXB. Note that the block B0 is positioned adjacent to an upper right portion of the block to be encoded 400 and the block B1 is positioned adjacent to a left portion of the block B0. The block B2 is positioned adjacent to an upper left portion of the block to be encoded 400.

Specifically, the vector encoding unit 16 selects an IBC vector of a block which has been subjected to the IBC prediction encoding first as the spatial prediction vector mvLXB in order from the block B0 to the block B2. On the other hand, if any of the blocks B0 to B2 is not subjected to the IBC prediction encoding, the vector encoding unit 16 assigns the spatial prediction vector mvLXA to the spatial prediction vector mvLXB. In this case, if the spatial prediction vector mvLXA has not been selected, the spatial prediction vector mvLXB is also not selected.

The vector encoding unit 16 registers the spatial prediction vectors mvLXA and mvLXB in the prediction vector candidate list mvpListLX (step S103). Note that, when the spatial prediction vector mvLXA and the spatial prediction vector mvLXB are equal to each other, the vector encoding unit 16 deletes the spatial prediction vector mvLXB from the candidate list mvpListLX.

The vector encoding unit 16 determines whether the number of candidates of the prediction vector registered in the candidate list mvpListLX is 2 or more (step S104). When the determination is affirmative (S104: Yes), the vector encoding unit 16 terminates the generation of the prediction vector candidate list. Then the vector encoding unit 16 sets a prediction vector based on the candidate list as described below. On the other hand, when the determination is negative (step S104: No), the vector encoding unit 16 executes a Temporal mode process.

In the Temporal mode process, the vector encoding unit 16 selects CoIPU which is a block (PU in this embodiment) on ColPic and which is positioned so as to correspond to a block to be encoded. The vector encoding unit 16 determines whether CoIPU has been subjected to the IBC prediction encoding (step S105).

Figure 5A:
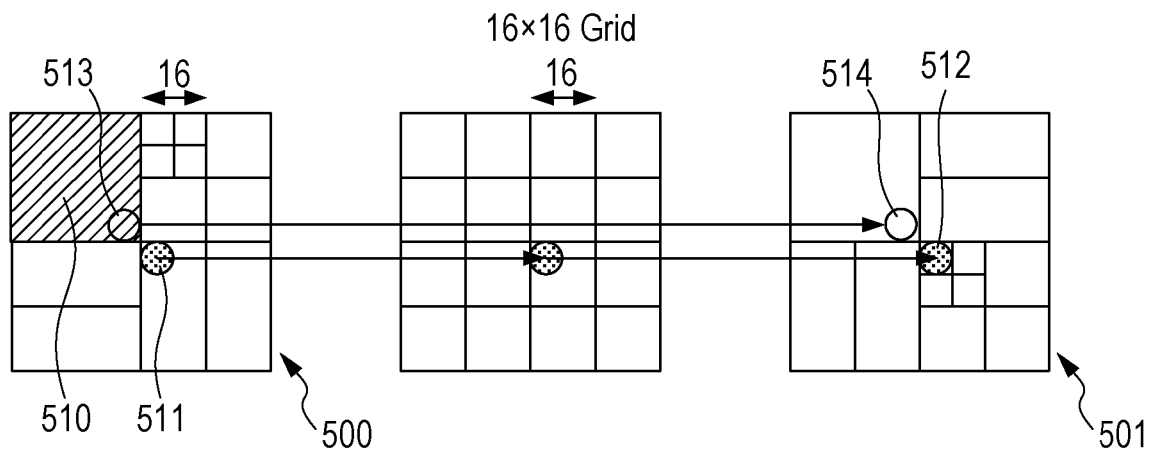
FIGS. 5A to 5C are diagrams illustrating examples of the positional relationship between a block to be encoded and CoIPU.
Figure 5B:
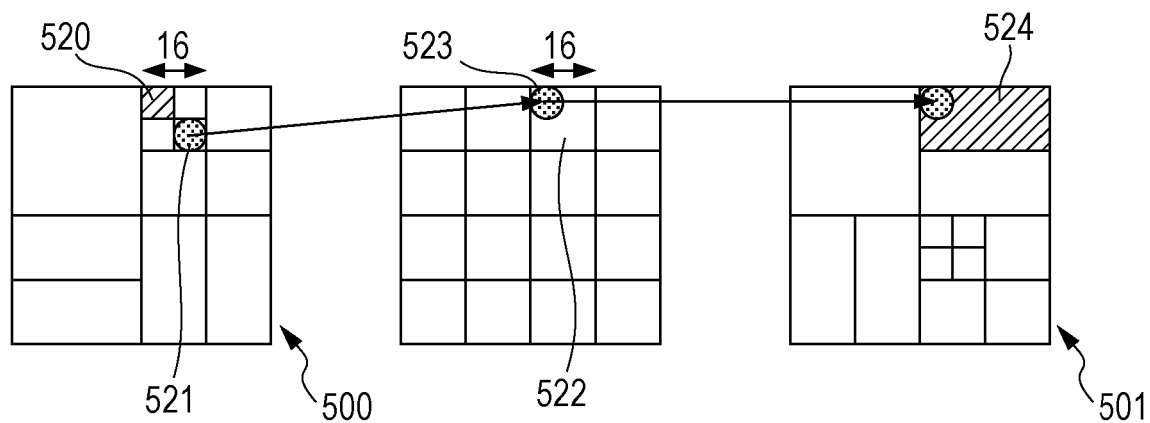
Figure 5C:
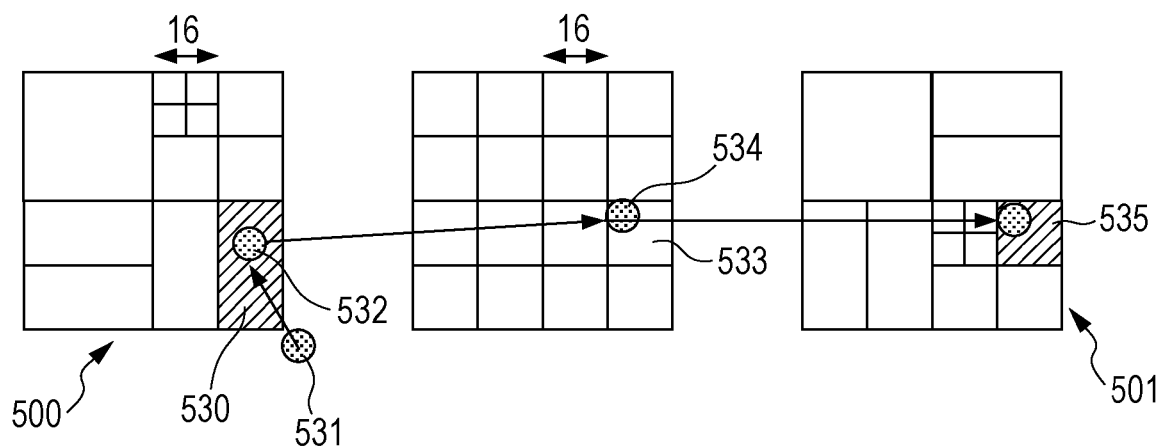

The positional relationship between the block to be encoded and CoIPU will be described with reference to FIGS. 5A to 5C. Note that a CTU 500 included in a picture is illustrated in FIGS. 5A to 5C. Basically, a PU positioned adjacent to a lower right portion of a PU which is the block to be encoded is selected as CoIPU. For example, when a PU which is positioned adjacent to a lower right of the block to be encoded has been subjected to the IBC prediction encoding, a PU including a pixel on an upper left end of a grid in a matrix of 16 pixels by 16 pixels including a pixel which is adjacent to a lower right portion to the block to be encoded is selected as CoIPU. Furthermore, when a PU including the pixel which is adjacent to the lower right of the block to be encoded does not exist or has not been subjected to the IBC prediction encoding, a PU including a pixel on a lower right end of the block to be encoded is selected as CoIPU.

In a case where a PU 510 which is the block to be encoded is larger than a block of a matrix of 16 pixels by 16 pixels and positioned in an upper left portion in the CTU 500 as illustrated in FIG. 5A, for example, a pixel 511 positioned adjacent to a lower right portion of the PU 510 is in the same position even in a unit of grid of in the matrix of 16 pixels by 16 pixels. Therefore, in ColPic 501, a PU 512 positioned adjacent to a lower right portion of the PU 510 is determined as a first candidate of CoIPU. Furthermore, a PU 514 including a pixel in the same position as a pixel 513 in a lower right end of the PU 510 is determined as a second candidate of CoIPU.

On the other hand, in a case where a PU 520 which is the block to be encoded is a block positioned in an upper left block in blocks obtained by dividing the block of the matrix of 16 pixels by 16 pixels by 4 as illustrated in FIG. 5B, a pixel 521 positioned adjacent to a lower right portion of the PU 520 is positioned in the vicinity of a center of a grid 522 of a matrix of 16 pixels by 16 pixels. Here, in ColPic 501, a PU 524 including a pixel 523 in an upper left end of the grid 522 is CoIPU.

Furthermore, in a case where a CTU boundary in a horizontal direction is sandwiched between the block to be encoded and a PU which is adjacent to a lower right portion of the block to be encoded, a position of a pixel on an upper left of the center of the block to be encoded is obtained and a grid of a matrix of 16 pixels by 16 pixels including the pixel is specified. Then a PU on ColPic including a pixel in an upper left end in the specified grid is determined as CoIPU.

In a case where a PU 530 which is the block to be encoded is positioned in a lower right portion in the CTU 500 as illustrated in FIG. 5C, for example, a CTU boundary is positioned between the PU 530 and a pixel 531 positioned in a lower right portion of the PU 530. Therefore, a center pixel 532 in the PU 530 is obtained and a grid 533 of a matrix of 16 pixels by 16 pixels including the pixel 532 is specified. In ColPic 501, a PU 535 including a pixel 534 positioned in an upper left end in the grid 533 is determined as CoIPU.

When CoIPU has been subjected to the IBC prediction encoding (step S105: Yes), the vector encoding unit 16 registers an IBC vector mvCol of CoIPU in the candidate list mvpListLX as a temporal prediction vector mvLXB (step S106).

On the other hand, when the determination is negative (step S105: No), an IBC vector is not defined in CoIPU, and therefore, the vector encoding unit 16 may not utilize an IBC vector of CoIPU as a prediction vector. Therefore, in this embodiment, the vector encoding unit 16 sets a region which is available for reference for determining the temporal prediction vector mvLXB (hereinafter simply referred to as a reference available region for convenience of explanation) around CoIPU in addition to CoIPU. Then the vector encoding unit 16 registers a temporal prediction vector mvLXB calculated based on the IBC vector defined for the PU which has been subjected to the IBC prediction encoding in PUs included in the reference available region in the candidate list mvpLX (step S107). Note that if an available IBC vector is not included even in the reference available region, the vector encoding unit 16 may not calculate the temporal prediction vector mvLXB.

Figure 6:
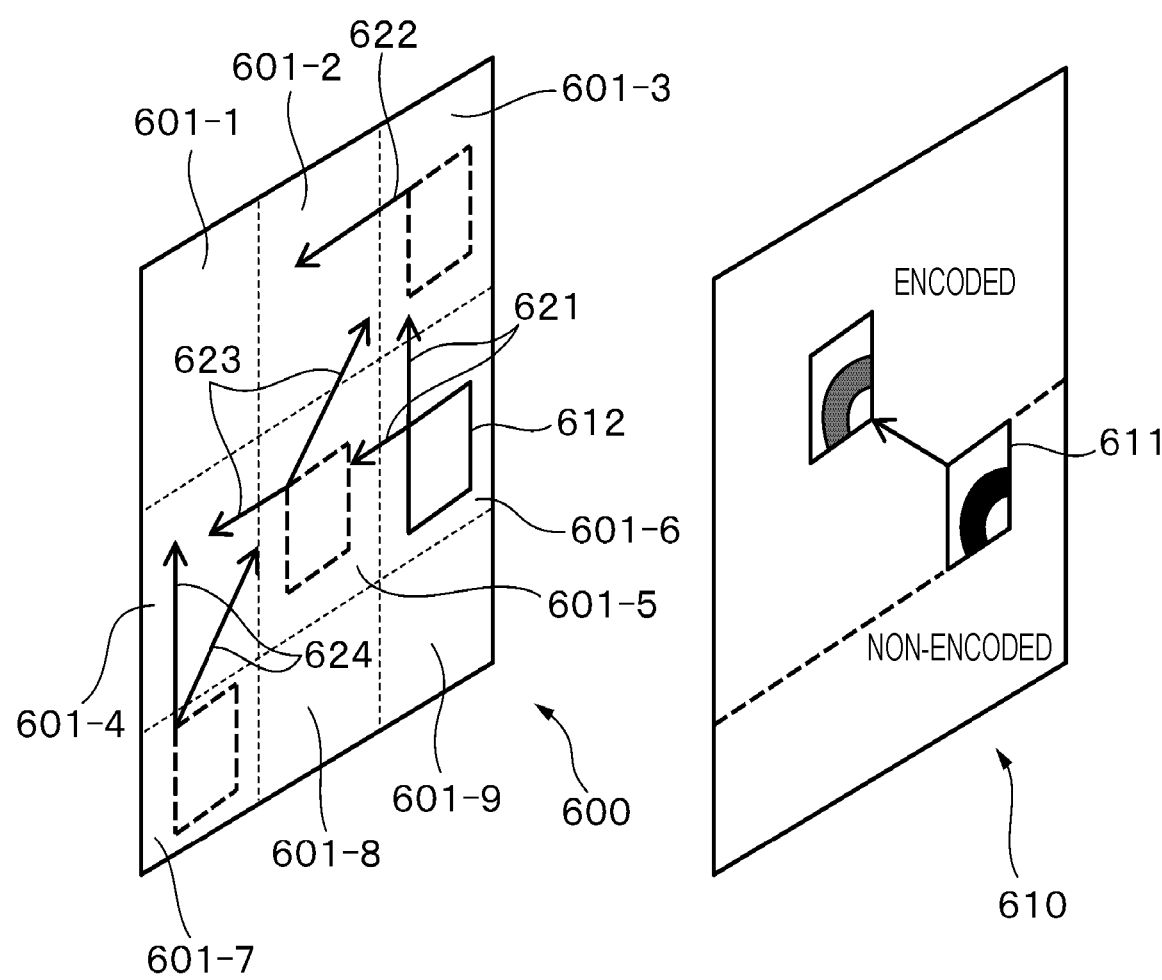
FIG. 6 is an explanatory diagram illustrating a region which may be referenced to determine a temporal prediction vector mvLXB.

FIG. 6 is an explanatory diagram illustrating a region which may be referenced to determine the temporal prediction vector mvLXB. For example, ColPic 600 is evenly divided into a predetermined number of sub-regions. In FIG. 6, ColPic 600 is divided into nine sub-regions 601-1 to 601-9 in total in three rows by three columns. In the sub-regions 601-1 to 601-9, a sub-region including CoIPU 612 corresponding to a block to be encoded 611 in a picture to be encoded 610 which is to be subjected to the IBC prediction encoding serves as the reference available region. In the example illustrated in FIG. 6, CoIPU 612 belongs to the sub-region 601-6, and therefore, the sub-region 601-6 is determined as the reference available region.

The vector encoding unit 16 calculates an average value of IBC vectors of the PUs which have been subjected to the IBC prediction encoding in the reference available region and registers the average value in the candidate list mvpListLX as the temporal prediction vector mvLXB.

According to a modification, the vector encoding unit 16 may incorporate, in addition to the sub-region including CoIPU, other sub-regions in the reference available region. Here, an encoded region is referenced in the IBC prediction encoding method, and therefore, the IBC vector is determined such that a left side or an upper side relative to the PU to be subjected to the IBC prediction encoding is referenced. Here, to reduce a difference vector between the temporal prediction vector and the IBC vector of the block to be encoded, the sub-region to be included in the reference available region has preferably been encoded before CoIPU. Specifically, a sub-region positioned on a left side or an upper side relative to the sub-region including CoIPU is preferably included in the reference available region.

Referring back to FIG. 6, since CoIPU 612 belongs to the sub-region 601-6 as described above, according to this modification, the sub-regions 601-1 to 601-5 positioned on a left side or an upper side relative to the sub region 601-6 are included in the reference available region as indicated by an arrow mark 621. Furthermore, if CoIPU 612 belongs to the sub-region 601-3 in an upper end portion, the sub-regions 601-1 and 601-2 positioned on a left side relative to the sub-region 601-3 are included in the reference available region as indicated by an arrow mark 622. Furthermore, if CoIPU 612 belongs to the sub-region 601-5 at the center, sub-regions included in a range from a left side to an upper right side relative to the sub-region 601-5, that is, the sub-regions 601-1 to 601-4, are included in the reference available region as indicated by an arrow mark 623. Furthermore, if CoIPU 612 belongs to a sub-region 601-7 at a left end, sub-regions included in a range from an upper side to an upper right side relative to the sub-region 601-7, that is, the sub-regions 601-1 to 601-6, are included in the reference available region as indicated by an arrow mark 624.

Note that, even in a case where the reference available region is to be expanded as described above, the vector encoding unit 16 may determine that sub-regions which are not adjacent to the sub-region including CoIPU are not incorporated in the reference available region.

Note that the ColPic division mode is not limited to the example described above, and ColPic may be evenly divided in a vertical direction and a horizontal direction. Alternatively, ColPic may be divided into sub-regions having different shapes. In this case, division positions of the sub-regions may be arbitrarily specified in the vertical direction and the horizontal direction. Alternatively, ColPic may be divided in a trial and error manner such that the numbers of IBC vectors included in the individual sub-regions are equal to each other. Alternatively, the IBC vectors of ColPic are subjected to clustering in accordance with a clustering method, such as a K-means method, and the division may be performed such that individual clusters serve as sub-regions, for example. Note that, as for a sub-region which does not include any IBC vector, an IBC vector of an adjacent sub-region, such as a sub-region which is adjacent to a left side or an upper side of the sub-region, may be copied.

Furthermore, as another modification, the vector encoding unit 16 may register an IBC vector calculated for a PU which is nearest to CoIPU in the PUs which have been subjected to the IBC prediction encoding in the reference available region in the candidate list mvpListLX as the temporal prediction vector mvLXB. Alternatively, the vector encoding unit 16 may register, in the candidate list mvpListLX as the temporal prediction vector mvLXB, a vector obtained by performing weighted average on IBC vectors of the PUs which have been subjected to the IBC prediction encoding in the reference available region using a weighted coefficient which becomes larger as a position is closer to CoIPU.

Note that, when the spatial prediction vector mvLXA and the spatial prediction vector mvLXB which have been registered in the candidate list mvpListLX are equal to each other, the vector encoding unit 16 deletes the spatial prediction vector mvLXB from the candidate list mvpListLX.

After step S106 or step S107, the vector encoding unit 16 determines whether the number of candidates of the prediction vector registered in the candidate list mvpListLX is 2 or more (step S108). When the determination is negative (S108: No), the vector encoding unit 16 registers a zero vector as a prediction vector candidate in the candidate list mvpListLX (step S109).

After step S109, the vector encoding unit 16 sets, as a prediction vector mvpLX, a candidate corresponding to a smaller difference vector relative to the IBC vector in the block to be encoded, that is, a candidate corresponding to a smaller error in the two candidates (step S110). Furthermore, also when the determination is affirmative in step S104 or step S108 (step S104 or step S108: Yes), the vector encoding unit 16 executes the process in step S110. Then the vector encoding unit 16 terminates the prediction vector determination procedure.

The vector selected as the prediction vector mvpLX is represented by a syntax mvpLxFlag indicating a position of the selected vector in the candidate list mvpListLX. The vector encoding unit 16 supplies the syntax mvpLxFlag indicating the position of the selected vector and a difference vector between the IBC vector in the block to be encoded and the prediction vector to the entropy encoding unit 18. Furthermore, the vector encoding unit 16 supplies the division mode of ColPic and syntax which defines the numbers of divisions in the vertical and horizontal directions to the entropy encoding unit 18.

Next, the Merge mode will be described.

Figure 7:
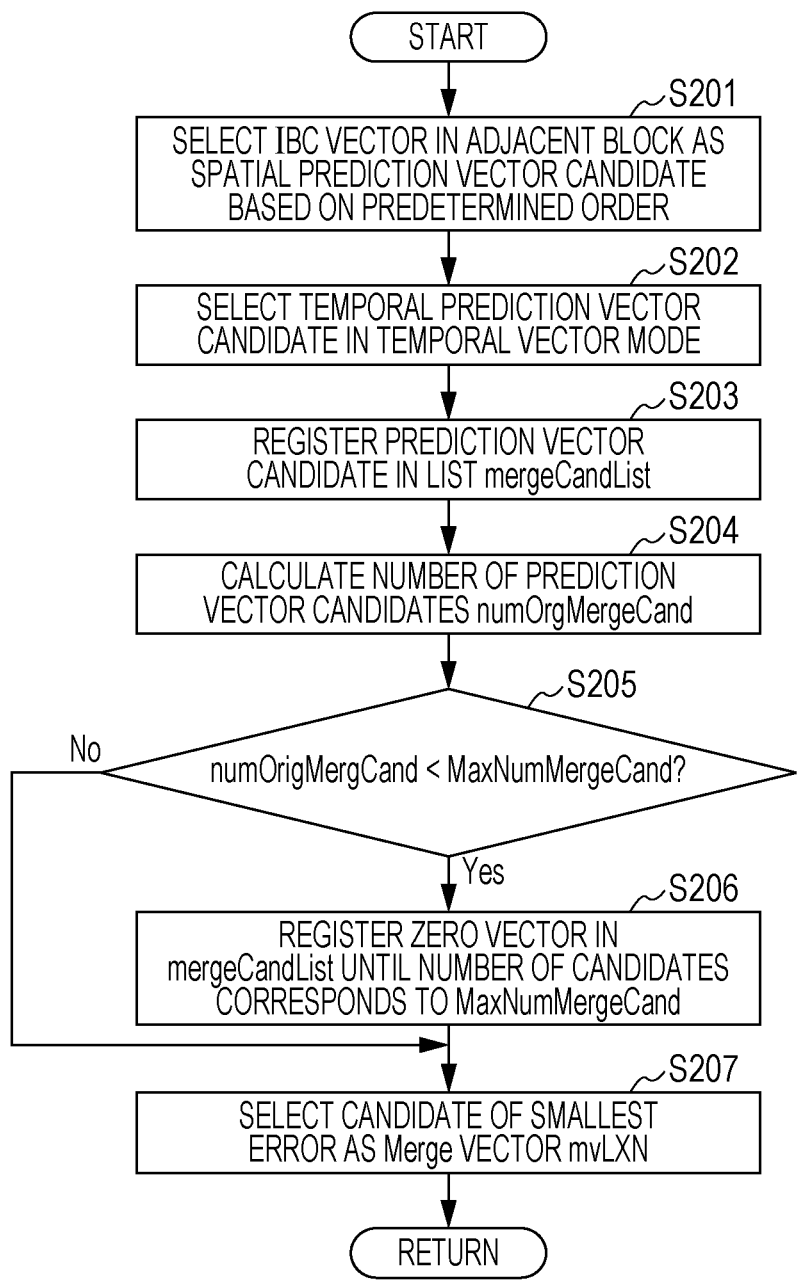
FIG. 7 is an operation flowchart of a procedure of generation of a prediction vector candidate list mergeCandList in a Merge mode.

FIG. 7 is an operation flowchart indicating a procedure of generation of a prediction vector candidate list mergeCandList in the Merge mode. In the Merge mode, the vector encoding unit 16 selects one of a number of available Merge vector candidates corresponding to a number indicated by syntax MaxNumMergeCand (5 at maximum) as a Merge vector mvLXN. The selected vector is represented by syntax mergeIdx indicating a position of a candidate list merge-CandList.

The vector encoding unit 16 selects an IBC vector of a block positioned adjacent to a left portion or an upper portion of the block to be encoded as a spatial prediction vector candidate in predetermined order (step S201).

Figure 8:
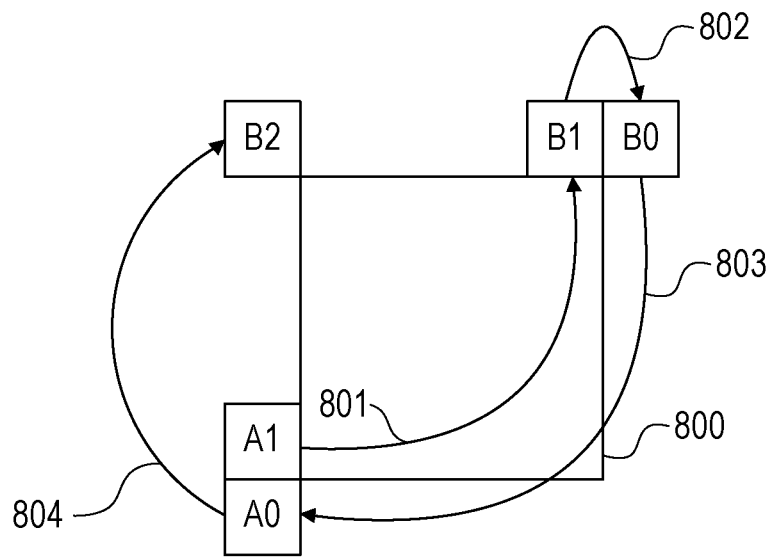
FIG. 8 is a diagram illustrating registration order of spatial prediction vectors in the Merge mode.

The selection of a spatial prediction vector will be described in detail with reference to FIG. 8. FIG. 8 is a diagram illustrating registration order of spatial prediction vectors in the Merge mode. The vector encoding unit 16 determines whether motion vectors of individual blocks are to be registered as a spatial prediction vector candidate in order from a block A1, a block B1, a block B0, a block A0, and a block B2 as indicated by arrow marks 801 to 804 in a PU 800 which is a block to be encoded.

Furthermore, if a plurality of spatial prediction vector candidates have the same value, one of the spatial prediction vector candidates remains and the others are deleted. For example, if a certain block is divided and a candidate of the block is a vector of another block, the block is not required to be divided and therefore is deleted. In a case of the block B2, the vector encoding unit 16 excepts a motion vector of the block B2 from the spatial prediction vector candidates if four spatial predication vector candidates have already been selected.

Next, the vector encoding unit 16 selects a temporal prediction vector candidate mvLXCol by executing a Temporal mode process (step S202). Note that the Temporal mode process in the Merge mode is the same as the Temporal mode process in the AMVP mode, and therefore, a detailed description of the Temporal mode process is omitted.

The vector encoding unit 16 registers a selected prediction vector candidate in the candidate list mergeCandList (step S203). Thereafter, the vector encoding unit 16 calculates the number numOrigMergeCand of prediction vector candidates registered in the candidate list mergeCandList (step S204).

The vector encoding unit 16 determines whether the number numOrigMergeCand of prediction vector candidates is smaller than MaxNumMergeCand (step S205). When the determination is affirmative (step S205: Yes), the candidate list mergeCandList has still space. Therefore, the vector encoding unit 16 registers a zero vector in the candidate list mergeCandList as a prediction vector candidate until the number of prediction vector candidates reaches MaxNumMergeCand (step S206).

After step S206, the vector encoding unit 16 selects a candidate in which a difference relative to the motion vector of the block to be encoded is minimum in the prediction vector candidates as a Merge vector mvLXN (step S207). Furthermore, also when the number numOrigMergeCand of prediction vector candidates is equal to or larger than MaxNumMergeCand in step S205 (step S205: No), the vector encoding unit 16 executes the process in step S207. Thereafter, the vector encoding unit 16 terminates the prediction vector determination procedure.

The vector selected as the prediction vector mvpLX is represented by syntax mvpLxFlag indicating a position of the selected vector in the candidate list mvpListLX. The vector encoding unit 16 supplies the syntax mvpLxFlag indicating the position of the selected vector to the entropy encoding unit 18. Furthermore, the vector encoding unit 16 supplies the division mode of ColPic and syntax which defines the numbers of divisions in the vertical and horizontal directions to the entropy encoding unit 18.

Figure 9:
FIG. 9 is a diagram illustrating an example of syntax which defines a method for dividing ColPic and the numbers of divisions in vertical and horizontal directions.

FIG. 9 is a diagram illustrating a division mode of ColPic and syntax which defines the numbers of divisions in the vertical and horizontal directions. A syntax 900 includes horizontal division number syntax Imax indicating the number of divisions in the horizontal direction, vertical division number syntax Jmax indicating the number of divisions in the vertical direction, and an even division syntax divave indicating whether ColPic is to be evenly divided. Furthermore, in a case where ColPic is not to be evenly divided, the syntax 900 includes a horizontal division position xDivri (i=0 to Imax−1) and a vertical division position yDivrj (j=0 to Jmax−1). Note that in a case where the even division syntax divave indicates that ColPic is not to be evenly divided, ColPic may be divided in accordance with a predetermined division mode as described above, for example. In this case, the syntax indicating the vertical division position and the syntax indicating the horizontal division position may be omitted.

Note that the syntax 900 may be defined for each picture, each GOP, or each sequence. When the syntax 900 is defined for each picture, the entropy encoding unit 18 adds encoded data of the syntax 900 for each picture. Furthermore, when the syntax 900 is defined for each GOP or each sequence, the entropy encoding unit 18 adds encoded data of the syntax 900 for each GOP or each sequence.

The storage unit 17 temporarily stores a local decoding block received from the decoding unit 15. The storage unit 17 supplies the local decoding picture or the local decoding block to the inter-picture motion searching unit 11, the in-picture motion searching unit 12, the encoding mode determination unit 13, the source encoding unit 14, and the decoding unit 15. Note that the storage unit 17 stores a predetermined number of local decoding pictures which are possibly be referenced by a picture to be encoded and discards old local decoding pictures in order of encoding when the number of local decoding pictures exceeds the predetermined number.

Furthermore, the storage unit 17 stores motion vectors of local decoding blocks which have been subjected to the inter prediction encoding. Similarly, the storage unit 17 stores IBC vectors of local decoding blocks which have been subjected to the IBC prediction encoding. Moreover, the storage unit 17 stores a combination of the division modes of the CU, the PU, and the TU selected for each of the CTUs and the encoding mode.

The entropy encoding unit 18 is an example of an addition unit which performs entropy encoding on quantization coefficients of the TUs of the CTU to be encoded and various syntax. Then the entropy encoding unit 18 incorporates the quantization coefficients which have been subjected to the entropy encoding and the various syntax into a bit stream indicating encoded video image data. Note that examples of the various syntax include syntax which defines a division mode of ColPic in the IBC mode as described above. Furthermore, the entropy encoding unit 18 performs the entropy encoding on difference vectors of PUs which have been subjected to the inter prediction encoding and to which the AMVP mode is applied and difference vectors of PUs which have been subjected to the IBC prediction encoding and to which the AMVP mode is applied.

In this embodiment, the entropy encoding unit 18 uses arithmetic coding processing, such as context-based adaptive binary arithmetic coding (CABAC) as an entropy encoding method. Then the entropy encoding unit 18 outputs a bit stream obtained by the entropy encoding.

The bit streams of the CTUs output from the entropy encoding unit 18 are coupled in predetermined order and head information defined by HEVC is assigned so that an encoded bit stream including encoded video image data may be obtained. The video image encoding apparatus 1 stores the encoded bit stream in a storage device (not illustrated) having a magnetic recording medium, an optical recording medium, or a semiconductor memory or outputs the encoded bit stream to another device.

Figure 10:
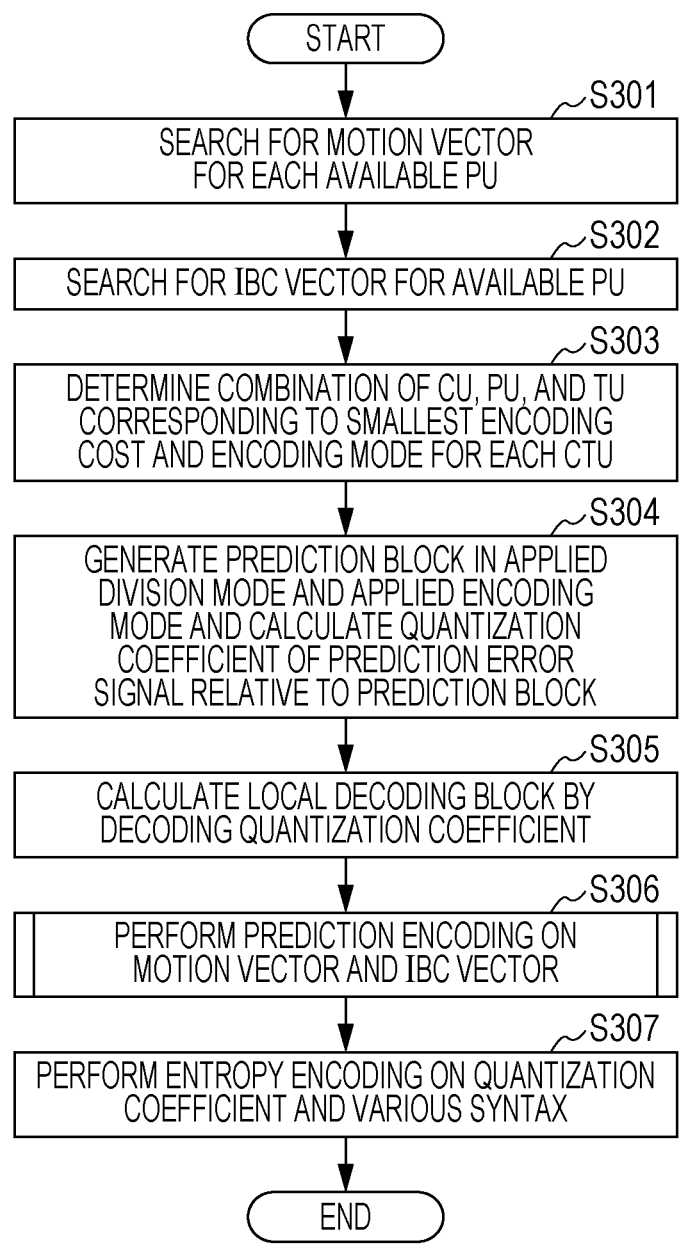
FIG. 10 is an operation flowchart of a video image encoding process.

FIG. 10 is an operation flowchart of a video image encoding process performed by the video image encoding apparatus 1. The video image encoding apparatus 1 performs encoding for each CTU in accordance with an operation flowchart below.

The inter-picture motion searching unit 11 calculates motion vectors of applicable PUs when the inter prediction encoding method is applicable to the picture to be encoded (step S301). Furthermore, the in-picture motion searching unit 12 calculates IBC vectors of the individual applicable PUs (step S302). The encoding mode determination unit 13 determines division modes for the CUs, the PUs, and the TUs, an encoding mode to be applied, and a vector mode to be applied based on the motion vectors of the individual PUs and the IBC vectors (step S303).

The source encoding unit 14 generates a prediction block in accordance with the division modes of the CUs and the PUs and the encoding mode and calculates a prediction error signal between pairs of pixel in each of the TUs and corresponding pixels of the prediction block for each TU. Thereafter, the source encoding unit 14 performs orthogonal transform and quantization on the prediction error signal for each TU so as to calculate a quantization coefficient for each TU (step S304).

The decoding unit 15 performs inverse quantization and invert orthogonal transform on the quantized coefficients of the TUs so as to restore prediction error signals of the TUs, calculates a local decoding block by adding values of corresponding pixels in prediction blocks, and store the local decoding block in the storage unit 17 (step S305). Note that when local decoding blocks are obtained for all the CTUs of the picture to be encoded, a local decoding picture is obtained by combining the local decoding blocks.

Furthermore, the vector encoding unit 16 performs prediction encoding on motion vectors of the individual PUs to be subjected to the inter prediction encoding and IBC vectors of the individual PUs to be subjected to the IBC prediction encoding in accordance with an applied vector mode (step S306).

The entropy encoding unit 18 generates an encoded bit stream of the CTU to be encoded by performing the entropy encoding on quantized coefficients of the TUs and various syntax so as to generate an encoded bit stream of the CTU to be encoded (step S307). The entropy encoding unit 18 outputs the obtained encoded bit stream. The video image encoding apparatus 1 thus terminates the video image encoding process.

As described above, the video image encoding apparatus 1 refers to the reference available region including blocks other than CoIPU, in addition to CoIPU so as to determine a temporal prediction vector of an IBC vector of a block which has been subjected to the IBC prediction encoding. Therefore, the video image encoding apparatus 1 may increase the number of IBC vectors which are calculated for ColPic and which may be selected as prediction vector candidates of the IBC vectors. Accordingly, the video image encoding apparatus 1 may improve possibility of applying of the IBC encoding method, and consequently, encoding efficiency of video image data may be improved.

Next, a video image decoding apparatus which decodes video image data encoded by the video image encoding apparatus 1 will be described.

Figure 11:
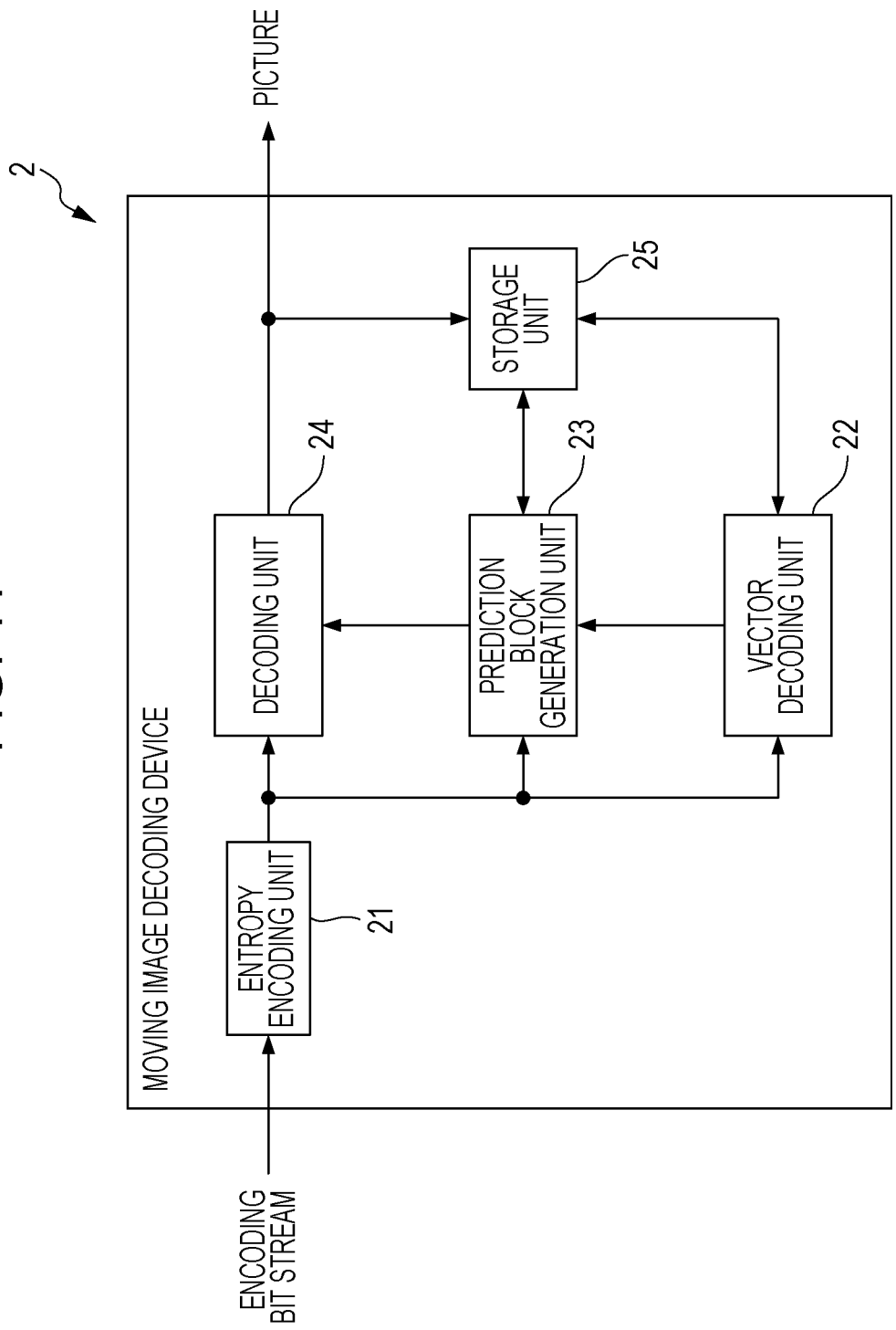
FIG. 11 is a diagram schematically illustrating a configuration of a video image decoding apparatus according to an embodiment.

FIG. 11 is a diagram schematically illustrating a configuration of a video image decoding apparatus according to an embodiment. A video image decoding apparatus 2 includes an entropy decoding unit 21, a vector decoding unit 22, a prediction block generation unit 23, a decoding unit 24, and a storage unit 25.

The units included in the video image decoding apparatus 2 are formed as individual circuits. Alternatively, the units included in the video image decoding apparatus 2 may be implemented in the video image decoding apparatus 2 as a single integrated circuit including circuits corresponding to the units. Furthermore, the units included in the video image decoding apparatus 2 may be functional modules which are realized by a computer program executed in a processor included in the video image decoding apparatus 2.

The video image decoding apparatus 2 obtains an encoded bit stream including encoded video image data through a communication network or an interface circuit for connecting the video image decoding apparatus 2 to the communication network. Then the video image decoding apparatus 2 stores the encoded bit stream in a buffer memory not illustrated. The video image decoding apparatus 2 reads encoded data from the buffer memory in a unit of CTU and supplies the data in the unit of CTU to the entropy decoding unit 21.

The entropy decoding unit 21 is an example of a separation unit which performs entropy decoding on the encoded data for each CTU. Then the entropy decoding unit 21 decodes quantization coefficients of the TUs included in the CTU so as to extract quantization coefficients. Furthermore, the entropy decoding unit 21 performs entropy decoding on various syntax including syntax indicating an employed division mode or syntax indicating an encoding method and obtains the syntax. For example, the entropy decoding unit 21 performs entropy decoding on syntax indicating positions of the PUs included in the CUs which have been subjected to the inter prediction encoding in the prediction vector candidate list. Furthermore, the entropy decoding unit 21 performs entropy decoding on difference vectors between motion vectors and prediction vectors for individual PUs to which the AMVP mode is employed. Similarly, the entropy decoding unit 21 performs entropy decoding on syntax indicating positions of the PUs included in the CUs which have been subjected to the IBC prediction encoding in the prediction vector candidate list. Furthermore, the entropy decoding unit 21 performs entropy decoding on difference vectors between IBC vectors and prediction vectors for individual PUs to which the AMVP mode is employed. Furthermore, the entropy decoding unit 21 performs entropy decoding on syntax which defines the division mode of ColPic and the numbers of divisions in the vertical and horizontal directions. Furthermore, the entropy decoding unit 21 performs entropy decoding on prediction modes of the PUs included in the CUs which have been subjected to the intra prediction encoding. Then the entropy decoding unit 21 supplies various syntax and the like used for decoding the motion vectors and of the IBC vectors to the vector decoding unit 22. Moreover, the entropy decoding unit 21 supplies the various syntax used for generation of a prediction block to the prediction block generation unit 23. Furthermore, the entropy decoding unit 21 supplies the quantization coefficients to the decoding unit 24.

The vector decoding unit 22 reproduces motion vectors in the PUs included in the CU which has been subjected to the inter prediction encoding in accordance with information indicating an applied vector mode, syntax indicating a position in a prediction vector candidate list, and difference vectors. Similarly, the vector decoding unit 22 reproduces IBC vectors in the PUs included in the CU which has been subjected to the IBC prediction encoding in accordance with syntax for defining the ColPic division mode, syntax indicating a position in a prediction vector candidate list, and difference vectors.

Note that the vector decoding unit 22 may specify a reference available region by executing the same process as the vector encoding unit 16 so as to generate a prediction vector candidate list based on the IBC vector included in the reference available region. In this case, the vector decoding unit 22 divides decoded ColPic into a plurality of sub-regions in accordance with the ColPic division mode and syntax for defining the numbers of divisions in the vertical and horizontal directions and specifies a reference available region based on the positional relationships between the sub-regions and CoIPU.

Then the vector decoding unit 22 specifies a candidate indicated by syntax indicating a position in the prediction vector candidate list as a prediction vector with reference to a generated prediction block candidate list. If an applied vector mode is the AMVP mode, the vector decoding unit 22 may reproduce the IBC vector by adding the decoded difference vector to the specified prediction vector. On the other hand, if the applied vector mode is the Merge mode, the vector decoding unit 22 determines the specified prediction vector as the IBC vector. Then the vector decoding unit 22 supplies the reproduced motion vector and the reproduced IBC vector to the prediction block generation unit 23 and stores the motion vector and the IBC vector in the storage unit 25.

In the CTU to be decoded, the prediction block generation unit 23 generates, for each CU, prediction blocks of the PUs included in the CU with reference to a decoded picture or a decoded region in the decoded picture. In this case, the prediction block generation unit 23 generates a prediction block by executing the same process as the source encoding unit 14 of the video image encoding apparatus 1. For example, in a case where a target CU has been subjected to the inter prediction encoding, the prediction block generation unit 23 performs motion compensation on a decoded picture read from the storage unit 25 for each PU in the CU based on a motion vector decoded for the PU so as to generate a prediction block. Similarly, in a case where a target CU has been subjected to the IBC prediction encoding, the prediction block generation unit 23 performs motion compensation on a decoded block read from the storage unit 25 for each PU in the CU based on an IBC vector decoded for the PU so as to generate a prediction block.

The prediction block generation unit 23 outputs the generated prediction block to the decoding unit 24.

The decoding unit 24 performs inverse quantization by multiplying the quantization coefficients of the TUs supplied from the entropy decoding unit 21 by predetermined numbers corresponding to quantized widths determined by the quantization parameter obtained from the decoded header information. Orthogonal transform coefficients of the individual TUs are restored by the inverse quantization. Thereafter, the decoding unit 24 performs an inverse orthogonal transform process on the orthogonal transform coefficients for individual TUs. Prediction error signals of individual pixels in the entire CTU are reproduced by executing the inverse quantization process and the inverse orthogonal transform process on the quantization coefficients of the individual TUs.

The decoding unit 24 may decode the individual PUs by adding reproduced prediction error signals corresponding to pixels included in the prediction blocks of the PUs to values of the pixels in the prediction blocks of the PUs. Then the decoding unit 24 decodes the CTU by coupling the decoded PUs in encoding order. The decoding unit 24 stores the decoded CTU in the storage unit 25. Furthermore, the decoding unit 24 decodes the entire picture by coupling the decoded CTUs in encoding order. The decoding unit 24 stores the decoded picture in the storage unit 25 and stores the decoded picture in a buffer memory. Decoded pictures stored in the buffer memory are output to a display device (not illustrated) in display order by a controller (not illustrated), for example.

The storage unit 25 temporarily stores the decoded CTU and the decoded picture supplied from the decoding unit 24. Then the storage unit 25 supplies the CTU as a reference region or the picture as a reference picture to the prediction block generation unit 23. Furthermore, the storage unit 25 supplies the decoded motion vectors of the PUs or the IBC vectors in the vector decoding unit 22. Note that the storage unit 25 stores a predetermined number of pictures and discards the old pictures in turn in the encoding order when a stored data amount exceeds an amount corresponding to the predetermined number.

Figure 12:
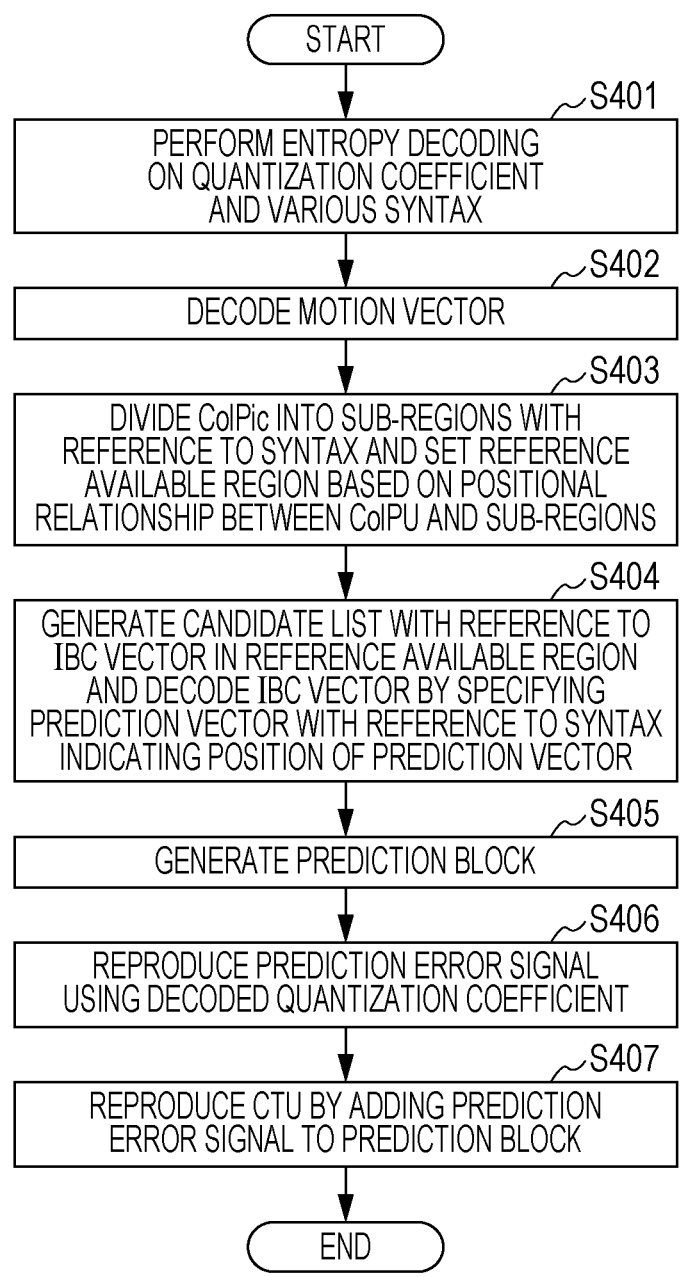
FIG. 12 is an operation flowchart of a video image decoding process.

FIG. 12 is a flowchart of an operation of a video image decoding process executed by the video image decoding apparatus 2. The video image decoding apparatus 2 executes the video image decoding process illustrated in FIG. 12 for each CTU to be decoded.

The entropy decoding unit 21 performs entropy decoding on data encoded for each CTU so as to reproduce the quantization coefficients of the TUs of the CTU to be decoded and various syntax (step S401).

The vector decoding unit 22 decodes the motion vectors of the PUs which have been subjected to the inter prediction encoding included in the CTU to be encoded in accordance with an applied vector mode (step S402). Furthermore, the vector decoding unit 22 divides ColPic into a plurality of sub-regions with reference to syntax indicating the ColPic division mode in each of the PUs which have been subjected to the IBC prediction encoding and sets a reference available region based on the positional relationships between the sub-regions and CoIPU (step S403). Then the vector decoding unit 22 generates a prediction vector candidate list using the IBC vector in the reference available region and specifies a prediction vector with reference to syntax indicating a position of a prediction vector in the candidate list so as to decode the IBC vector (step S404).

the prediction block generation unit 23 generates prediction blocks for individual PUs in accordance with encoding modes applied to the individual CUs included in the CTU to be decoded and decoded motion vectors or the decoded IBC vectors (step S405).

The decoding unit 24 performs inverse quantization by multiplying the quantization coefficients supplied from the entropy decoding unit 21 by predetermined numbers corresponding to quantization widths determined by the quantization parameter obtained from the decoded header information included in the encoded bit stream. Then the decoding unit 24 reproduces a prediction error signal of the CTU to be decoded by performing the inverse orthogonal transform process on an orthogonal transform signal for each TU (step S406). Thereafter, the decoding unit 24 reproduces the CTU to be decoded by adding reproduced prediction error signals corresponding to pixels included in the prediction blocks to values of the pixels (step S407). The decoding unit 24 stores the reproduced CTU in the storage unit 25. Then the video image decoding apparatus 2 terminates the video image decoding process performed on the CTU to be decoded.

As described above, the video image decoding apparatus may decode encoded video image data even when a block which has been subjected to the IBC prediction encoding by the video image encoding apparatus according to the foregoing embodiment.

Note that, according to a modification, the vector encoding unit 16 may determine a temporal prediction vector with reference to an IBC vector included in the reference available region irrespective of whether CoIPU has been subjected to the IBC prediction encoding in the PU which has been subjected to the IBC prediction encoding. In this case, the process in step S105 and the process in step S106 may be omitted in the operation flowchart in FIG. 6.

According to another modification, the ColPic division mode may be limited to a mode specified in advance. In this case, a flag indicating whether equal division is to be performed may be omitted in the syntax for specifying the ColPic division mode. Furthermore, in a case where the even division of ColPic in the vertical and horizontal directions is specified in advance and the numbers of divisions in the vertical and horizontal directions are also specified in advance, the syntax indicating the ColPic division mode may not be transmitted to the video image decoding apparatus. Similarly, the syntax specifying the ColPic division mode may not be transmitted to the video image decoding apparatus even in a case where positions of the division in the vertical and horizontal directions are not arbitrarily determined but the positions are determined in accordance with a predetermined division mode specified in advance. Therefore, encoding efficiency may be improved since the syntax is not added to the encoded bit stream.

According to another modification, the vector encoding unit 16 may set a reference available region for the spatial prediction vector, as with the temporal prediction vector, when the IBC vector is subjected to the prediction encoding such that blocks other than adjacent blocks are also included in the reference available region. By this, the number of IBC vectors which may be referenced is increased even for the spatial prediction vector. Then the vector encoding unit 16 may obtain spatial prediction vectors using the IBC vectors obtained in the reference available region. Specifically, the vector encoding unit 16 divides the picture to be encoded into a plurality of sub-regions similarly to ColPic in accordance with the foregoing embodiment or the foregoing modification. Then the vector encoding unit 16 determines a sub-region including a PU which is the block to be encoded as the reference available region. Furthermore, as with the foregoing modification, the vector encoding unit 16 may incorporate a sub-region positioned on a left side or an upper side of the sub-region including the PU serving as the block to be encoded in the reference available region. Then, as with the foregoing embodiment or the foregoing modification, the vector encoding unit 16 may determine an average value of the IBC vectors included in the reference available region, a weighted average value of distances to the block to be encoded, or an IBC vector which is closest to the block to be encoded as the spatial prediction vector. Furthermore, the spatial prediction vector may be obtained from a block which is adjacent to a left portion of the PU which is the block to be encoded and a block which is adjacent to an upper portion of the PU. Therefore, a reference available region including a sub-region which is adjacent to a left portion of a subj-region including the PU which is the block to be encoded and a reference available region including a sub-region which is adjacent to an upper portion of the sub-region including the PU may be set. Then the vector encoding unit 16 may obtain a spatial prediction vector by performing the process described above for each reference available region. In this case, the sub-region including the PU which is the block to be encoded may be incorporated in any of the reference available regions.

Note that the vector encoding unit 16 may determine a temporal prediction vector based on an IBC vector of CoIPU without setting the reference available region although a reference available region is set for the spatial prediction vector according to this modification.

Note that the picture to be encoded may be divided into a plurality of sub-regions in accordance with a predetermined division mode instead of the equal division. However, since the entire picture to be encoded has not been encoded in this case, distribution of IBC vectors in the entire picture to be encoded has not been determined. Therefore, the vector encoding unit 16 may refer to the IBC vector of ColPic so as to divide the picture to be encoded into a plurality of sub-regions so that the numbers of IBC vectors are the same or in accordance with a cluster ring method, for example, as with the foregoing modification. In this case, also the vector decoding unit 22 of the video image decoding apparatus 2 performs the process in the modification so as to divide the picture to be decoded into a plurality of sub-regions and set a reference available region based on the positional relationships between the block to be decoded and the sub-regions.

Figure 13:
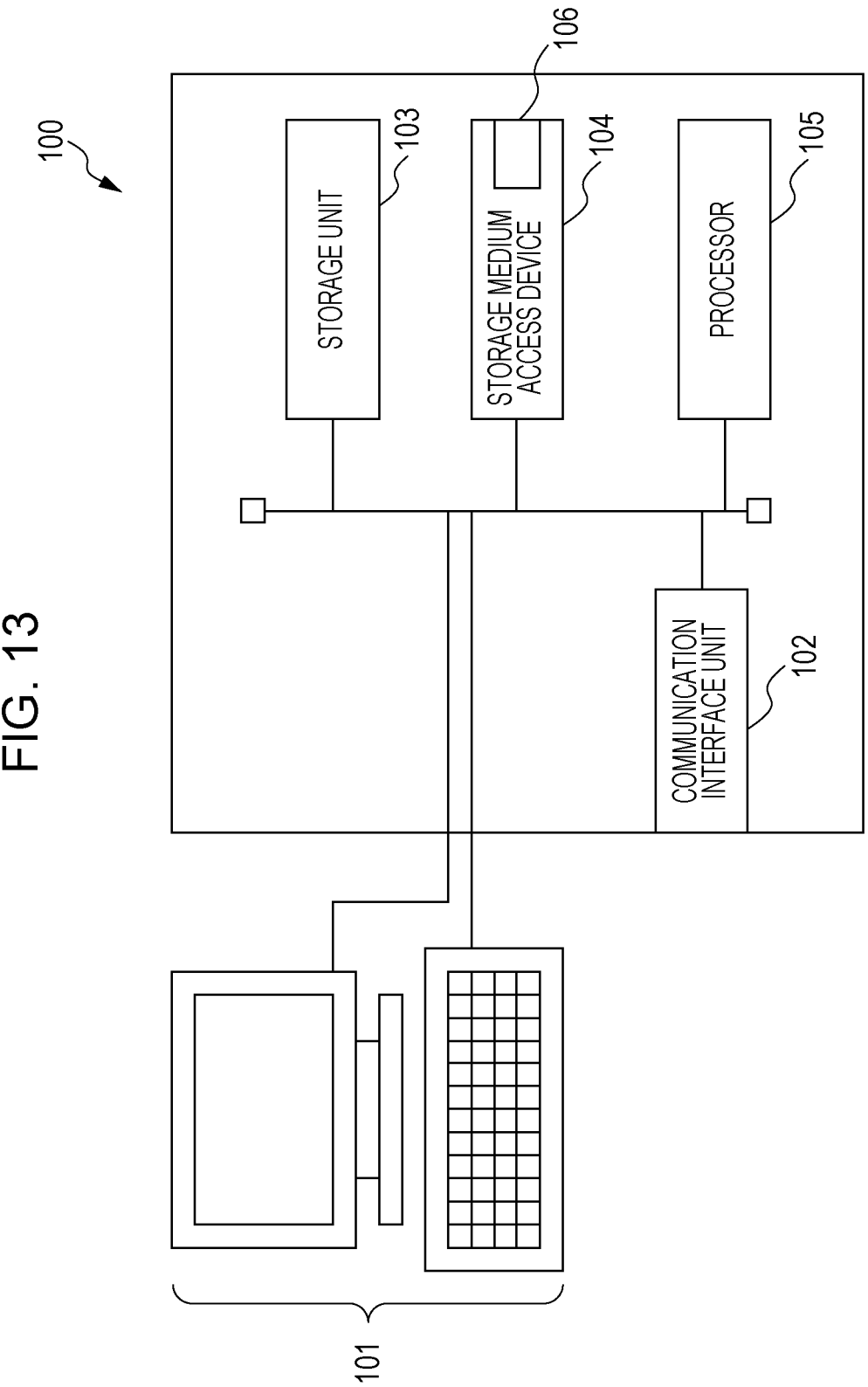
FIG. 13 is a diagram illustrating a configuration of a computer operating as the video image encoding apparatus or the video image decoding apparatus.

FIG. 13 is a diagram illustrating a configuration of a computer which operates as the video image encoding apparatus or the video image decoding apparatus when a computer program which realizes functions of the units included in the video image encoding apparatus or the video image decoding apparatus according to the foregoing embodiment or the modification thereof operates. The computer is usable as a server which generates a screen image in a system which realizes Wireless display or Virtual Desktop Infrastructure (VDI) or a terminal which reproduces an encoded screen image.

A computer 100 includes a user interface unit 101, a communication interface unit 102, a storage unit 103, a storage medium access device 104, and a processor 105. The processor 105 is connected to the user interface unit 101, the communication interface unit 102, the storage unit 103, and the storage medium access device 104 through a bus, for example.

The user interface unit 101 includes an input device, such as a keyboard and a mouse, and a display device, such as a liquid crystal display. Furthermore, the user interface unit 101 may include a device, such as a touch panel display, constituted by the input device and the display device in an integrated manner. Then the user interface unit 101 outputs an operation signal for selecting video image data to be encoded or video image data to be decoded to the processor 105 in accordance with a user operation, for example. Note that the video image data to be encoded or the video image data to be decoded may be determined by an application program operating in the processor 105.

The communication interface unit 102 includes a communication interface for connection to the communication network based on a communication standard, such as the Ethernet (registered trademark), and a control circuit for controlling the communication interface. Then the communication interface unit 102 obtains the video image data to be encoded from another device connected to the communication network and supplies the data to the processor 105. The communication interface unit 102 may output the encoded video image data supplied from the processor 105 to another device through the communication network. Furthermore, the communication interface unit 102 may obtain a bit stream including the encoded video image data which is to be decoded from another device connected to the communication network and supply the bit stream to the processor 105.

The storage unit 103 includes a readable/writable semiconductor memory and a read-only semiconductor memory, for example. Then the storage unit 103 stores a computer program for executing the video image encoding process executed by the processor 105 or a computer program for executing the video image decoding process. Furthermore, the storage unit 103 stores data generated in course of or as a result of the video image encoding process or the video image decoding process.

The storage medium access device 104 makes an access to a storage medium 106, such as a magnetic disc, a semiconductor memory card, or an optical recording medium. The storage medium access device 104 reads a computer program for the video image encoding process or a computer program for the video image decoding process which is stored in the storage medium 106 and which is to be executed by the processor 105, and supplies the program to the processor 105.

The processor 105 includes at least one of a central processing unit (CPU), a graphics processing unit (GPU), and a numerical value calculation processor. Then the processor 105 encodes video image data by executing the computer program for the video image encoding process according to the foregoing embodiment or the foregoing modification. Then the processor 105 stores the encoded video image data in the storage unit 103 or outputs the encoded video image data to another device through the communication interface unit 102. Alternatively, the processor 105 decodes encoded video image data by executing the computer program for the video image encoding process according to the foregoing embodiment or the foregoing modification. Then the processor 105 displays the decoded picture in a display device of the user interface unit 101.

Note that the computer program for the video image encoding process and the computer program for the video image decoding process according to the foregoing embodiment or the foregoing modification may be provided in a state in which the programs are recorded in a computer readable medium. However, such a recording medium does not include carrier waves.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A video image encoding apparatus for encoding a picture included in video image data, the apparatus comprising:
    a memory, and
    a processor coupled to the memory and configured to:
    calculate an in-picture motion vector indicating a spatial movement amount between a block to be encoded in the picture to be encoded and a reference block in an encoded region in the picture to be encoded among a plurality of blocks obtained by dividing the picture to be encoded;
    obtain a prediction vector for predicting the in-picture motion vector of the block to be encoded based on at least one of
        a first in-picture motion vector calculated in a first reference available region including a plurality of blocks including a block which is encoded before the block to be encoded is encoded and which is not adjacent to the block to be encoded, and
        a second in-picture motion vector calculated in a second reference available region, in an already encoded reference picture, including a plurality of blocks including a block in a position corresponding to the block to be encoded in the picture to be encoded;
    perform prediction encoding on the in-picture motion vector of the block to be encoded based on the prediction vector;
    calculate a prediction error between the reference block and the block to be encoded; and
    encode the prediction error.

2. The video image encoding apparatus according to claim 1, wherein, when a plurality of second in-picture motion vectors are included in the second reference available region, the prediction vector is obtained based on an average vector of the plurality of second in-picture motion vectors.

3. The video image encoding apparatus according to claim 1, wherein, when a plurality of second in-picture motion vectors are included in the second reference available region, the prediction vector is obtained based on one of the second in-picture motion vectors which is calculated based on a block which is closest to a block in a position corresponding to the block to be encoded.

4. The video image encoding apparatus according to claim 1, wherein the reference picture is divided into a plurality of sub-regions and one of the sub-regions which includes a block in a position corresponding to the block to be encoded is selected as the second reference available region.

5. The video image encoding apparatus according to claim 4, wherein the second reference available region further includes one of the plurality of sub-regions which includes a block which is encoded before a block in a position corresponding to the block to be encoded is encoded.

6. The video image encoding apparatus according to claim 4,
    wherein the reference picture is divided into the plurality of sub-regions in accordance with a division mode which defines a method for dividing the reference picture into the plurality of sub-regions, and
    wherein the processor is further configured to add information indicating the division mode to encoded data of the video image data.

7. The video image encoding apparatus according to claim 4, wherein the reference picture is divided into the plurality of sub-regions such that numbers of the in-picture motion vectors included in the individual sub-regions are the same.

8. The video image encoding apparatus according to claim 1,
wherein a list of candidates of a prediction vector of the in-picture motion vector of the block to be encoded is generated based on at least one of the first in-picture motion vector and the second in-picture motion vector, and information indicating candidates of the prediction vector in the list is obtained, and
wherein the processor is further configured to add the information indicating candidates of the prediction vector to encoded data of the video image data.

9. A video image decoding apparatus which decodes video image data, comprising:
a memory, and
a processor coupled to the memory and configured to;
extract a prediction error of a block to be decoded in a picture to be decoded and information indicating a candidate of a prediction vector in a list of candidates of the prediction vector of an in-picture motion vector indicating a spatial movement amount between the block to be decoded in the picture to be decoded and a decoded reference block in the picture to be decoded;
generate a list of candidates of a prediction vector of the in-picture motion vector based on at least one of
a first in-picture motion vector calculated in a first reference available region including a plurality of blocks including a block which is decoded before the block to be decoded is decoded in the picture to be decoded and which is not adjacent to the block to be decoded, and
a second in-picture motion vector calculated in a second reference available region including a plurality of blocks including a block in a position corresponding to the block to be decoded in a reference picture decoded before the picture to be decoded is decoded;
specify a prediction vector based on the list and information indicating candidates of the prediction vector,
decode the in-picture motion vector based on the specified prediction vector; and
decode the block to be decoded based on the reference block specified based on the decoded in-picture motion vector and the prediction error.

10. The video image decoding apparatus according to claim 9, wherein the reference picture is divided into a plurality of sub-regions and one of the sub-regions which includes a block in a position corresponding to the block to be decoded is selected as the second reference available region.

11. The video image decoding apparatus according to claim 10, wherein one of the plurality of sub-regions which includes a block which is decoded before a block in the position corresponding to the block to be decoded is decoded is further included in the second reference available region.

12. The video image decoding apparatus according to claim 10,
wherein information indicating a division mode which defines a method for dividing the reference picture into the plurality of sub-regions is further extracted from encoded data of the video image data, and
wherein the reference picture is divided into the plurality of sub-regions in accordance with the division mode.

13. A video image encoding method for encoding a picture to be encoded included in video image data, the video image encoding method comprising:
calculating an in-picture motion vector indicating a spatial movement amount between a block to be encoded in the picture to be encoded and a reference block in an encoded region in the picture to be encoded among a plurality of blocks obtained by dividing the picture to be encoded;
obtaining a prediction vector for predicting the in-picture motion vector in the block to be encoded based on at least one of
a first in-picture motion vector calculated in a first reference available region including a plurality of blocks including a block which is encoded before the block to be encoded is encoded and which is not adjacent to the block to be encoded, and
a second in-picture motion vector calculated in a second reference available region, in an already encoded picture, including a plurality of blocks including a block in a position corresponding to the block to be encoded in the picture to be encoded;
performing prediction encoding on the in-picture motion vector of the block to be encoded based on the prediction vector; and
calculating a prediction error between the reference block for the block to be encoded and the block to be encoded; and
encoding the prediction error.

14. A video image decoding method for decoding video image data, the video image decoding method comprising:
extracting a prediction error of a block to be decoded in a picture to be decoded and information indicating a candidate of a prediction vector in a list of candidates of the prediction vector of an in-picture motion vector indicating a spatial movement amount between the block to be decoded in the picture to be decoded and a decoded reference block in the picture to be decoded;
generating a list of candidates of a prediction vector of the in-picture motion vector based on at least one of
a first in-picture motion vector calculated in a first reference available region including a plurality of blocks including a block which is decoded before the block to be decoded is decoded in the picture to be decoded and which is not adjacent to the block to be decoded, and
a second in-picture motion vector calculated in a second reference available region including a plurality of blocks including a block in a position corresponding to the block to be decoded in a reference picture decoded before the picture to be decoded is decoded,
specifying a prediction vector based on the list and information indicating candidates of the prediction vector, and decoding the in-picture motion vector based on the specified prediction vector; and
decoding the block to be decoded based on the reference block specified based on the decoded in-picture motion vector and the prediction error.

15. A non-transitory computer-readable medium storing a video image encoding program causing a computer to perform a process comprising:
calculating an in-picture motion vector indicating a spatial movement amount between a block to be encoded in the picture to be encoded and a reference block in an encoded region in the picture to be encoded among a plurality of blocks obtained by dividing the picture to be encoded;
obtaining a prediction vector for predicting the in-picture motion vector in the block to be encoded based on at least one of
a first in-picture motion vector calculated in a first reference available region including a plurality of blocks including a block which is encoded before the block to be encoded is encoded and which is not adjacent to the block to be encoded, and a second in-picture motion vector calculated in a second reference available region, in an already encoded picture, including a plurality of blocks including a block in a position corresponding to the block to be encoded in the picture to be encoded;

performing prediction encoding on the in-picture motion vector of the block to be encoded based on the prediction vector; and calculating a prediction error between the reference block for the block to be encoded and the block to be encoded; and encoding the prediction error.

16. A non-transitory computer-readable medium storing a video image decoding program causing a computer to perform a process comprising:

extracting a prediction error of a block to be decoded in a picture to be decoded and information indicating a candidate of a prediction vector in a list of candidates of the prediction vector of an in-picture motion vector indicating a spatial movement amount between the block to be decoded in the picture to be decoded and a decoded reference block in the picture to be decoded;

generating a list of candidates of a prediction vector of the in-picture motion vector based on at least one of a first in-picture motion vector calculated in a first reference available region including a plurality of blocks including a block which is decoded before the block to be decoded is decoded in the picture to be decoded and which is not adjacent to the block to be decoded, and a second in-picture motion vector calculated in a second reference available region including a plurality of blocks including a block in a position corresponding to the block to be decoded in a reference picture decoded before the picture to be decoded is decoded;

specifying a prediction vector based on the list and information indicating candidates of the prediction vector;

decoding the in-picture motion vector based on the specified prediction vector; and decoding the block to be decoded based on the reference block specified based on the decoded in-picture motion vector and the prediction error.

* * * * *